(12) United States Patent
Veguru et al.

(10) Patent No.: US 11,743,621 B2
(45) Date of Patent: Aug. 29, 2023

(54) NETWORK SWITCHES SYSTEMS FOR OPTICAL COMMUNICATIONS NETWORKS

(71) Applicant: Infinera Corporation

(72) Inventors: Tulasi Veguru, Sunnyvale, CA (US); David F. Welch, Atherton, CA (US); Mats Plantare, Stockholm (SE); Prasad Paranjape, Fremont, CA (US); Ting-Kuang Chiang, Saratoga, CA (US); Gus Elmer, San Jose, CA (US)

(73) Assignee: Infinera Corporation, San Jose, CA (US)

(*) Notice: Subject to any disclaimer, the term of this patent is extended or adjusted under 35 U.S.C. 154(b) by 0 days.

(21) Appl. No.: 17/069,818

(22) Filed: Oct. 13, 2020

(65) Prior Publication Data
US 2021/0152902 A1     May 20, 2021

Related U.S. Application Data

(60) Provisional application No. 62/913,354, filed on Oct. 10, 2019.

(51) Int. Cl.
*H04Q 11/00*     (2006.01)

(52) U.S. Cl.
CPC ..... *H04Q 11/0067* (2013.01); *H04Q 11/0005* (2013.01); *H04Q 2011/0016* (2013.01);
(Continued)

(58) Field of Classification Search
CPC .................................................. H04Q 11/0067
See application file for complete search history.

(56) References Cited

U.S. PATENT DOCUMENTS

| 4,483,000 A | 11/1984 | Yamamoto et al. |
| 4,528,565 A | 7/1985 | Hauptmann |

(Continued)

FOREIGN PATENT DOCUMENTS

| EP | 0512642 | 11/1992 |
| EP | 3208957 | 8/2017 |
| WO | WO 2012100714 | 8/2012 |
| WO | WO 2014114332 | 7/2014 |

OTHER PUBLICATIONS

Zhang et al., "Digital subcarrier multiplexing for flexible spectral allocation in optical transport network", Optics Express, vol. 19, No. 22, Oct. 24, 2011 (Year: 2011).*

(Continued)

*Primary Examiner* — Shi K Li
(74) *Attorney, Agent, or Firm* — David L. Soltz

(57) ABSTRACT

Optical subcarriers may be employed to transmit data in a point-to-multi-point network whereby a hub node including a network switch receives such data from a client and transmits information indicative of such data to multiple leaf or network nodes, where data intended for such leaf node is output. Often the rate at which data is supplied to the hub node is different than the rate at which information indicative of the data is transmitted. Moreover, the client data may have a format that is different than that associated with the transmitted information indicative of the client data. Consistent with the present disclosure, client data is inverse multiplexed to lower data rate streams and then multiplexed to a plurality of inputs, each of which corresponding to a respective optical subcarrier. Information indicative of the data may be allocated to multiple subcarriers, if the a single carrier lacks sufficient capacity or bandwidth to meet the bandwidth requirements of the leaf node. Buffer circuits may also be employed to "shape" or delay the outputs or flows of the multiplexer so that data is fed, for example, to a transmit (Continued)

portion of chip 200b of the network switch at a uniform rate rather than in non-uniform data bursts, which, under certain circumstances, could exceed the capacity of such transmit portion. In a further example, leaf nodes include circuitry for monitoring the amount of received data, and, if such received exceeds a certain threshold, a request is sent from the leaf node to the hub to transmit data at a rate equal to or substantially equal to the received data rate. As a result, symmetric data flows may be achieved whereby the leaf nodes transmit and receive data at the same or substantially the same rate.

65 Claims, 14 Drawing Sheets

(52) U.S. Cl.
CPC ............... *H04Q 2011/0081* (2013.01); *H04Q 2011/0086* (2013.01); *H04Q 2011/0088* (2013.01)

(56) References Cited

U.S. PATENT DOCUMENTS

| | | |
|---|---|---|
| 5,153,762 A | 10/1992 | Huber |
| 5,208,692 A | 5/1993 | McMahon |
| 5,596,436 A | 1/1997 | Sargis |
| 5,822,094 A | 10/1998 | O'Sullivan |
| 5,825,857 A | 10/1998 | Reto |
| 6,046,838 A | 4/2000 | Kou |
| 6,362,913 B2 | 3/2002 | Ooi et al. |
| 6,525,857 B1 | 2/2003 | Way |
| 6,535,313 B1 * | 3/2003 | Fatehi ............... H04J 14/0227 398/101 |
| 6,563,880 B1 | 5/2003 | Hunsinger et al. |
| 6,580,544 B1 | 6/2003 | Lin et al. |
| 6,687,044 B2 | 2/2004 | Paquet |
| 7,266,306 B1 | 9/2007 | Harley et al. |
| 7,466,919 B1 | 2/2008 | Birk et al. |
| 7,346,284 B2 | 3/2008 | Wan |
| 7,376,358 B2 | 5/2008 | Roberts et al. |
| 7,447,436 B2 | 11/2008 | Yee |
| 7,701,842 B2 | 4/2010 | Roberts et al. |
| 7,715,710 B2 | 5/2010 | Wan |
| 7,729,621 B2 | 6/2010 | Nahapetian et al. |
| 7,756,421 B2 | 7/2010 | Roberts |
| 7,826,752 B1 | 11/2010 | Zanoni |
| 8,184,992 B2 | 5/2012 | Kikuchi |
| 8,203,777 B2 | 6/2012 | Smith et al. |
| 8,412,047 B2 | 4/2013 | Tanaka |
| 8,437,645 B2 | 5/2013 | Boffi et al. |
| 8,472,810 B2 | 6/2013 | Akiyama |
| 8,477,056 B2 | 7/2013 | Sun et al. |
| 8,477,656 B2 | 7/2013 | O'Mahony |
| 8,478,137 B2 | 7/2013 | Komaki et al. |
| 8,655,190 B2 | 2/2014 | Wu et al. |
| 8,682,180 B1 | 3/2014 | Nimon et al. |
| 8,730,079 B2 | 5/2014 | Tudose |
| 8,768,177 B2 | 7/2014 | Wu et al. |
| 8,861,977 B2 | 10/2014 | McNicol |
| 8,929,750 B2 | 1/2015 | Ishihara |
| 8,965,203 B1 | 2/2015 | Vahdat |
| 8,971,723 B2 | 3/2015 | Le Taillandier De Gabory |
| 8,989,593 B2 | 3/2015 | Sun et al. |
| 9,020,363 B2 | 4/2015 | Yasuda |
| 9,048,957 B2 | 6/2015 | Nakashima |
| 9,112,609 B2 | 8/2015 | Kim et al. |
| 9,154,231 B2 | 10/2015 | Kaneda |
| 9,166,692 B1 | 10/2015 | Felderman |
| 9,197,320 B2 | 11/2015 | Vassilieva |
| 9,244,928 B1 | 1/2016 | Hiroshi |
| 9,270,379 B2 | 2/2016 | Huang et al. |
| 9,281,915 B2 | 3/2016 | Kaneda |
| 9,363,585 B2 | 6/2016 | Carpini |
| 9,419,720 B2 | 8/2016 | Akiyama |
| 9,461,749 B2 | 10/2016 | Jansen et al. |
| 9,485,554 B1 | 11/2016 | Kim |
| 9,553,675 B2 | 1/2017 | Karar et al. |
| 9,608,866 B2 | 3/2017 | Rajan |
| 9,673,907 B1 | 6/2017 | Vassilieva |
| 9,686,020 B2 | 6/2017 | Mochizuki et al. |
| 9,705,592 B1 | 7/2017 | Schmogrow |
| 9,735,881 B1 | 8/2017 | Agazzi et al. |
| 9,991,953 B1 | 6/2018 | Fludger |
| 10,014,975 B2 | 7/2018 | Krause et al. |
| 10,027,424 B2 | 7/2018 | Zhuge et al. |
| 10,243,653 B2 | 3/2019 | Wiswell |
| 10,243,688 B2 | 3/2019 | Vassilieva |
| 10,348,410 B1 | 7/2019 | Charlton |
| 10,374,623 B1 | 8/2019 | Oveis Gharan |
| 10,374,721 B2 | 8/2019 | Awdalla |
| 10,389,447 B1 | 8/2019 | Khandani |
| 10,397,190 B2 | 8/2019 | Akhavain Mohammadi |
| 10,491,302 B1 | 11/2019 | Morris |
| 10,523,315 B2 | 12/2019 | Jiang |
| 10,547,388 B2 | 1/2020 | Ikeda |
| 10,574,362 B2 | 2/2020 | Chen |
| 10,587,358 B1 | 3/2020 | Ebrahimzad |
| 2002/0003641 A1 | 1/2002 | Hall |
| 2002/0005971 A1 | 1/2002 | Sasai |
| 2002/0034194 A1 | 3/2002 | Shattil |
| 2002/0067883 A1 | 6/2002 | Lo |
| 2002/0114038 A1 | 8/2002 | Arnon |
| 2002/0122518 A1 | 9/2002 | Yasuda et al. |
| 2002/0145783 A1 | 10/2002 | Chang |
| 2003/0020995 A1 | 1/2003 | Harasawa |
| 2003/0223751 A1 | 12/2003 | Shimizu |
| 2004/0016874 A1 | 1/2004 | Rao |
| 2004/0019459 A1 | 1/2004 | Dietz |
| 2004/0032643 A1 | 2/2004 | Chimfwembe |
| 2004/0033074 A1 | 2/2004 | Hsu |
| 2004/0105682 A1 | 6/2004 | Roberts |
| 2004/0197103 A1 | 7/2004 | Roberts |
| 2004/0151109 A1 | 8/2004 | Batra |
| 2004/0198265 A1 | 10/2004 | Wallace |
| 2004/0208614 A1 | 10/2004 | Price |
| 2004/0252996 A1 | 12/2004 | McNicol |
| 2005/0008085 A1 | 1/2005 | Lee |
| 2005/0074037 A1 | 4/2005 | Rickard |
| 2005/0111789 A1 | 5/2005 | Hayes |
| 2005/0147415 A1 | 7/2005 | Fee |
| 2005/0169585 A1 | 8/2005 | Aronson |
| 2005/0175112 A1 | 8/2005 | Pisani |
| 2005/0175339 A1 | 8/2005 | Herskowits |
| 2006/0078336 A1 | 4/2006 | McNicol et al. |
| 2006/0093052 A1 | 5/2006 | Cho |
| 2006/0159454 A1 | 7/2006 | Bjornstad |
| 2006/0215540 A1 | 9/2006 | Krishnamoorthi |
| 2006/0233147 A1 | 10/2006 | Karabinis |
| 2006/0269295 A1 | 11/2006 | Way |
| 2006/0280510 A1 | 12/2006 | Onaka |
| 2007/0004465 A1 | 1/2007 | Papasakellariou |
| 2007/0025421 A1 | 2/2007 | Shattil |
| 2007/0092263 A1 | 4/2007 | Agazzi |
| 2008/0063409 A1 | 3/2008 | Toliver |
| 2008/0085125 A1 | 4/2008 | Frankel |
| 2008/0232816 A1 | 9/2008 | Hoshida |
| 2008/0267630 A1 | 10/2008 | Qian |
| 2009/0110033 A1 | 4/2009 | Shattil |
| 2009/0154336 A1 | 6/2009 | Green |
| 2009/0190929 A1 | 7/2009 | Khurgin |
| 2009/0196603 A1 | 8/2009 | Zhou |
| 2009/0214224 A1 | 8/2009 | Cho |
| 2009/0232234 A1 | 9/2009 | Du |
| 2009/0238578 A1 | 9/2009 | Taylor |
| 2009/0238580 A1 | 9/2009 | Kikuchi |
| 2009/0257344 A1 | 10/2009 | Huang |
| 2009/0257755 A1 | 10/2009 | Buelow |
| 2009/0092389 A1 | 11/2009 | Wei |
| 2010/0021163 A1 | 1/2010 | Shieh |
| 2010/0021166 A1 | 1/2010 | Way |
| 2010/0028002 A1 | 2/2010 | Qian |

(56) References Cited

U.S. PATENT DOCUMENTS

| | | |
|---|---|---|
| 2010/0086303 A1 | 4/2010 | Qian |
| 2010/0142964 A1 | 6/2010 | Chang et al. |
| 2010/0142967 A1 | 6/2010 | Perez |
| 2010/0178057 A1 | 7/2010 | Shieh |
| 2010/0189445 A1 | 7/2010 | Nakashima |
| 2010/0215368 A1 | 8/2010 | Qian |
| 2010/0246581 A1 | 9/2010 | Henry |
| 2010/0254707 A1 | 10/2010 | Peng |
| 2010/0329671 A1 | 12/2010 | Essiambre |
| 2010/0329683 A1 | 12/2010 | Liu |
| 2011/0097092 A1 | 4/2011 | Wagner et al. |
| 2011/0135301 A1* | 6/2011 | Myslinski ........... H04J 14/0201 398/34 |
| 2011/0142450 A1 | 6/2011 | Tanzi et al. |
| 2011/0150475 A1 | 6/2011 | Soto et al. |
| 2011/0176813 A1 | 7/2011 | Kim |
| 2011/0182577 A1 | 7/2011 | Wu |
| 2011/0249978 A1 | 10/2011 | Sasaki |
| 2011/0255870 A1 | 10/2011 | Grigoryan |
| 2012/0002703 A1 | 1/2012 | Yamashita |
| 2012/0033965 A1 | 2/2012 | Zhang |
| 2012/0045209 A1 | 2/2012 | Boyd |
| 2012/0082466 A1 | 4/2012 | Wu |
| 2012/0093510 A1 | 4/2012 | Zhang |
| 2012/0099864 A1 | 4/2012 | Ishihara |
| 2012/0141130 A1 | 6/2012 | Nakashima |
| 2012/0141135 A1 | 6/2012 | Yang |
| 2012/0148264 A1 | 6/2012 | Liu |
| 2012/0219285 A1 | 8/2012 | Dahan |
| 2012/0251119 A1 | 10/2012 | McNicol |
| 2012/0251121 A1 | 10/2012 | McNicol |
| 2012/0263471 A1 | 10/2012 | Buchali |
| 2012/0269510 A1 | 10/2012 | Hui |
| 2012/0269515 A1 | 10/2012 | Cvijetic |
| 2013/0070785 A1 | 3/2013 | Liu |
| 2013/0070786 A1 | 3/2013 | Liu |
| 2013/0100907 A1* | 4/2013 | Liu ..................... H04L 5/0037 370/329 |
| 2013/0101296 A1 | 4/2013 | Nishimoto |
| 2013/0108271 A1 | 5/2013 | Tang et al. |
| 2013/0136449 A1 | 5/2013 | Liu |
| 2013/0170834 A1 | 7/2013 | Cho et al. |
| 2013/0191877 A1 | 7/2013 | Rakib |
| 2013/0195452 A1 | 8/2013 | Hui |
| 2013/0202303 A1 | 8/2013 | Wilkinson |
| 2013/0251364 A1 | 9/2013 | Pachnicke |
| 2013/0286847 A1 | 10/2013 | Schmidt |
| 2014/0010543 A1 | 1/2014 | Lee |
| 2014/0056371 A1 | 2/2014 | Ji |
| 2014/0072303 A1 | 3/2014 | Pfau |
| 2014/0079390 A1 | 3/2014 | Kim |
| 2014/0079391 A1 | 3/2014 | Kim |
| 2014/0092924 A1 | 4/2014 | Krause et al. |
| 2014/0099116 A1 | 4/2014 | Bai |
| 2014/0126916 A1 | 5/2014 | Ota |
| 2014/0153925 A1 | 6/2014 | Nishihara et al. |
| 2014/0205286 A1* | 7/2014 | Ji ..................... H04J 14/0298 398/45 |
| 2014/0233963 A1 | 8/2014 | Le Taillandier De Gabory |
| 2014/0241727 A1 | 8/2014 | Lim et al. |
| 2014/0270759 A1 | 9/2014 | Djordjevic |
| 2014/0270761 A1 | 9/2014 | Xu |
| 2014/0270803 A1 | 9/2014 | Olsson |
| 2014/0294381 A1 | 10/2014 | McNicol |
| 2014/0314411 A1 | 10/2014 | Huang |
| 2014/0314416 A1 | 10/2014 | Vassilieva |
| 2014/0341587 A1 | 11/2014 | Nakashima |
| 2014/0363164 A1 | 12/2014 | Kim |
| 2014/0376930 A1 | 12/2014 | Shiba |
| 2015/0063808 A1 | 3/2015 | Xia |
| 2015/0071642 A1 | 3/2015 | Tanaka |
| 2015/0093118 A1 | 4/2015 | Jia |
| 2015/0098700 A1 | 4/2015 | Zhu |
| 2015/0117860 A1 | 4/2015 | Braun |
| 2015/0125160 A1 | 5/2015 | Wen |
| 2015/0188637 A1 | 7/2015 | Tanimura |
| 2015/0188642 A1 | 7/2015 | Sun |
| 2015/0229332 A1 | 8/2015 | Yuan |
| 2015/0229401 A1 | 8/2015 | Tanaka |
| 2015/0280853 A1 | 10/2015 | Sun |
| 2015/0288456 A1 | 10/2015 | Zhu |
| 2015/0289035 A1 | 10/2015 | Mehrvar |
| 2015/0296278 A1 | 10/2015 | Liu |
| 2015/0333860 A1 | 11/2015 | Rahn |
| 2016/0013881 A1 | 1/2016 | Rejaly et al. |
| 2016/0029403 A1 | 1/2016 | Roy et al. |
| 2016/0037242 A1* | 2/2016 | Su ..................... H04J 14/025 398/45 |
| 2016/0050021 A1 | 2/2016 | Hua |
| 2016/0057516 A1 | 2/2016 | Hochberg |
| 2016/0094292 A1 | 3/2016 | Mochizuki |
| 2016/0099777 A1 | 4/2016 | Liu |
| 2016/0112141 A1 | 4/2016 | Rahn |
| 2016/0142150 A1 | 5/2016 | Lyubomirsky |
| 2016/0191168 A1 | 6/2016 | Huang |
| 2016/0192042 A1 | 6/2016 | Mitchell |
| 2016/0197681 A1 | 7/2016 | Sun |
| 2016/0218812 A1 | 7/2016 | Okabe |
| 2016/0233963 A1 | 8/2016 | Zhuge et al. |
| 2016/0261347 A1 | 9/2016 | Karar |
| 2016/0277816 A1 | 9/2016 | Yuang |
| 2016/0316281 A1 | 10/2016 | Keyworth |
| 2016/0323039 A1 | 11/2016 | Sun et al. |
| 2017/0005747 A1 | 1/2017 | Kim |
| 2017/0019168 A1 | 1/2017 | Menard |
| 2017/0033864 A1 | 2/2017 | Nagarajan |
| 2017/0033999 A1 | 2/2017 | Nagarajan |
| 2017/0041691 A1 | 2/2017 | Rickman |
| 2017/0054513 A1* | 2/2017 | Guo ..................... H04L 5/0048 |
| 2017/0070313 A1 | 3/2017 | Kato |
| 2017/0078028 A1 | 3/2017 | Zhang |
| 2017/0078044 A1 | 3/2017 | Hino |
| 2017/0104535 A1 | 4/2017 | Hoshida |
| 2017/0134836 A1 | 5/2017 | Sindhy |
| 2017/0149507 A1 | 5/2017 | Le Taillandier De Gabory |
| 2017/0163347 A1 | 6/2017 | Akiyama |
| 2017/0222716 A1 | 8/2017 | Nakashima |
| 2017/0237500 A1 | 8/2017 | Nishimoto |
| 2017/0250775 A1 | 8/2017 | Kato |
| 2017/0324480 A1 | 11/2017 | Elmirghani |
| 2017/0366267 A1 | 12/2017 | Campos |
| 2017/0367061 A1 | 12/2017 | Kim |
| 2018/0034555 A1 | 2/2018 | Goh |
| 2018/0097550 A1* | 4/2018 | Perlman ..................... H04L 5/14 |
| 2018/0115407 A1 | 4/2018 | Melikyan |
| 2018/0120520 A1 | 5/2018 | Kelly |
| 2018/0145761 A1 | 5/2018 | Zhuge |
| 2018/0198547 A1 | 7/2018 | Mehrvar |
| 2018/0219632 A1 | 8/2018 | Yoshida |
| 2018/0234285 A1 | 8/2018 | Djordjevic |
| 2018/0241476 A1 | 8/2018 | Johnson |
| 2018/0278331 A1 | 9/2018 | Cao |
| 2018/0324717 A1 | 11/2018 | Zhou |
| 2018/0359047 A1 | 12/2018 | Vassilieva |
| 2019/0020409 A1 | 1/2019 | Le Taillandier De Gabory |
| 2019/0097728 A1 | 3/2019 | Frankel |
| 2019/0123819 A1 | 4/2019 | Jiang |
| 2019/0149242 A1 | 5/2019 | Torbatian |
| 2019/0149389 A1 | 5/2019 | Torbatian |
| 2019/0253153 A1 | 8/2019 | Sun |
| 2019/0260493 A1 | 8/2019 | Chimfwembe |
| 2019/0288777 A1 | 9/2019 | Ishimura |
| 2019/0312640 A1 | 10/2019 | Binkai |
| 2020/0076508 A1 | 3/2020 | Jia |
| 2020/0177525 A1 | 6/2020 | Morris |

OTHER PUBLICATIONS

Xenos, "What is FlexEthernet and why is it so important?", Ciena, May 2017, downloaded from www.ciena.com (Year: 2017).*

J. Leuthold et al., "Super Channels Based on Nyquist Multiplexing," 2012 17th Opto-Electronics and Communications Conference (OECC 2012) Technical Digest, Jul. 2012, Busan, Kor.

(56) References Cited

OTHER PUBLICATIONS

S. Watanabe et al., "Optical Coherent Broad-Band Transmission for Long-Haul and Distribution Systems Using Subcarrier Multiplexing," Journal of Lightwave Technology, vol. 11, No. 1, Jan. 1993, pp. 116-127.

M. Jinno et al., "Demonstration of Novel Spectrum-Efficient Elastic Optical Path Network with Per-Channel Variable Capacity of 40 Gb/s to Over 400 Gb/s," ECOC 2008, Sep. 21-25, 2008, Brussels, Belgium, Th.3.F.6.

Y. Chen et al., "Experimental Demonstration of Roadm Functionality on an Optical Scfdm Superchannel," IEEE Photonics Technology Letters, vol. 24, No. 3, Feb. 1, 2012, pp. 215-217.

Adaptive Software Defined Terabit Transceiver for Flexible Optical Networks, Public executive summary of the Final Project Periodic Report, Jun. 16, 2016.

Hillerkus, Single-Laser Multi-Terabit/s Systems, KIT Scientific Publishing, 2013, Chapters 1, 3, and 6.

Hu et al., "Flexible and Concurrent All-Optical VPN in OFDMA PON," IEEE Photonics Technology Journal, vol. 5, No. 6, Dec. 2013.

Bosco et al., "On the Performance of Nyquist-WDM Terabit Superchannels Based on PM-BPSK, PM-QPSK, PM-8QAM or PM-16QAM Subcarriers," Journal of Lightwave Technology, vol. 29, No. 1, Jan. 1, 2011, pp. 53-60.

K. Roberts et al., "Flexible Transceivers," ECOC Technical Digest, 2012, We.3.A.3.

K. Roberts et al., "High Capacity Transport—100G and Beyond," Journal of Lightwave Technology, vol. 33, No. 3, Feb. 1, 2015, pp. 563-578.

J. Reis et al., "Performance Optimization of Nyquist Signaling for Spectrally Efficient Optical Access Networks [Invited]," J. Opt. Commun. Netw./vol. 7, No. 2, Feb. 2015, pp. A200-A208.

R. Ferreira et al, Coherent Nyquist UDWDM-PON With Digital Signal Processing in Real Time, Journal of Lightwave Technology, vol. 34, No. 2, Jan. 15, 2016, pp. 826-833.

A. Shahpari et al., "Coherent Access: A Review", Journal of Lightwave Technology, vol. 35, No. 4, Feb. 15, 2017, pp. 1050-1058.

P. Layec et al., "Rate-Adaptable Optical Transmission and Elastic Optical Networks," Chapter 15, Enabling Technologies for High Spectral-efficiency Coherent Optical Communication Networks, First Edition, 2016 John Wiley & Sons, Inc. Published 2016, pp. 507-545.

J. Altabas, "Cost-effective Transceiver based on a RSOA and a VCSEL for Flexible uDWDM Networks," IEEE Photonics Technology Letters ( vol. 28 , Issue: 10, May 15, 15, 2016, pp. 1111-1114.

K. Roberts et al., "Beyond 100 Gb/s: Capacity, Flexibility, and Network Optimization," J. Opt. Commun. Netw./vol. 9, No. 4/Apr. 2017, pp. C12-C24.

Lavery et al., "Digital Coherent Receivers for Long-Reach Optical Access Networks," Journal of Lightwave Technology, vol. 31, No. 4, Feb. 15, 2013, pp. 609-620.

V. Vujicic, "Optical Multicarrier Sources for Spectrally Efficient Optical Networks," A Dissertation submitted in fulfilment of the requirements for the award of Doctor of Philosophy (Ph.D.) to the Dublin City University, Dec. 2015, Chapters 1, 2, and 6.

Straullu et al., "Single-Wavelength Downstream FDMA-PON at 32 Gbps and 34 dB ODN Loss," IEEE Photonics Technology Letters, vol. 27, No. 7, Apr. 1, 2015, pp. 774-777.

Y. Zhang et al., "Digital subcarrier multiplexing for flexible spectral allocation in optical transport network," Oct. 24, 2011 / vol. 19, No. 22 / Optics Express 21882.

R. Schmogrow et al., "Nyquist Frequency Division Multiplexing for Optical Communications," CLEO Technical Digest, OSA 2012, CTh1H.2.

P Khodashenas. "Investigation of Spectrum Granularity for Performance Optimization of Flexible Nyquist-WDM-Based Optical Networks." Journal of Lightwave Technology, vol. 33, No. 23, Dec. 1, 2015 pp. 4767-4774.

Mishra et al., "Flexible RF-Based Comb Generator," IEEE Photonics Technology Letters, vol. 25, No. 7, Apr. 1, 2013, pp. 701-704.

M. Jinno et al., "Multiflow Optical Transponder for Efficient Multilayer Optical Networking," IEEE Communications Magazine • May 2012, pp. 56-65.

Kim Roberts, "100G and Beyond," OFC 2014, OSA 2014, Tu3J.1.

J. Fischer, "Digital signal processing for coherent UDWDM passive optical networks," ITG-Fachbericht 248: Photonische Netze 05.—Jun. 5, 2014 in Leipzig, VDE Verlag GMBH • Berlin • Offenbach, Germany, ISBN 978-3-8007-3604-1.

Kottke et al., "Coherent UDWDM PON with joint subcarrier reception at OLT," Optics Express, Jul. 2, 2014.

Lavery et al., "Reduced Complexity Equalization for Coherent Long-Reach Passive Optical Networks," J. Opt. Commun. Netw./vol. 7, No. 1/Jan. 2015, pp. A16-A27.

Lazaro et al., "Flexible PON Key Technologies: Digital Advanced Modulation Formats and Devices," 2014 16th International Conference on Transparent Optical Networks (ICTON), Tu.B3.2.

Optical Internetworking Forum—Technology Options for 400G Implementation OIF-Tech-Options-400G-01.0, Jul. 2015.

Riccardi et al., "Sliceable bandwidth variable transponder: the Idealist vision," 2015 European Conference on Networks and Communications (EuCNC), pp. 330-334.

Sambo et al., "Next Generation Sliceable Bandwidth Variable Transponders," IEEE Communications Magazine, Feb. 2015, pp. 163-171.

P. Schindler et al., "Colorless FDMA-PON With Flexible Bandwidth Allocation and Colorless, Low-Speed ONUs [Invited]," J. Opt. Commun. Netw./vol. 5, No. 10/Oct. 2013, pp. A204-A212.

Schmogrow et al., "Real-time Nyquist signaling with dynamic precision and flexible non-integer oversampling," Jan. 13, 2014 | vol. 22, No. 1 | DOI:10.1364/OE.22.000193 | Optics Express 193.

Schmogrow et al., "Real-Time Digital Nyquist-WDM and OFDM Signal Generation: Spectral Efficiency Versus DSP Complexity," ECOC Technical Digest, 2012 OSA, Mo.2.A.4.

Boutaba et al., "Elastic Optical Networking for 5G Transport," J Netw Syst Manage (2017) 25m pp. 819-847 123.

S. Smolorz et al., "Demonstration of a Coherent UDWDM-PON with Real-Time Processing," OFC/NFOEC 2011, PDPD4.

H. Rohde et al. "Coherent Ultra Dense WDM Technology for Next Generation Optical Metro and Access Networks," Journal of Lightwave Technology, vol. 32, No. 10, May 15, 2014 pp. 2041-2052.

Ze Dong et al., "Very-High-Throughput Coherent Ultradense WDM-PON Based on Nyquist-ISB Modulation," IEEE Photonics Technology Letters, vol. 27, No. 7, Apr. 1, 2015, pp. 763-766.

Rohde et al., "Digital Multi-Wavelength Generation and Real Time Video Transmission in a Coherent Ultra Dense WDM PON," OFC/NFOEC Technical Digest, 2013 OSA, OM3H.3.

International Search Report issued in connection with PCT/US2020/023871 dated Sep. 24, 2020.

Guo-Wei Lu et al., "Optical subcarrier processing for Nyquist SCM signals via coherent spectrum overlapping in four-wave mixing with coherent multi-tone pump", Optics Express, vol. 26, No. 2, Jan. 22, 2018.

International Search Report issued in connection with PCT/US2020/018180 dated Sep. 18, 2020.

International Search Report issued in connection with PCT/US2020/036209 dated Oct. 1, 2020.

International Search Report issued in connection with PCT/US2020/018292 dated Jun. 4, 2020.

International Search Report issued in connection with PCT/US2020/021024 dated Aug. 3, 2020.

Wei et al: Mac Protocols for Optical Orthogonal Frequency Division Multiple Access (OFDMA)-based Passive Optical Networks, OFC/NFOEC 2008, paper JWA82, Feb. 24-28, 2008 (Year: 2008).

Cerisola et al., "Subcarrier multiplex of packet headers in a WDM optical network and a nouvel ultrafast header clock-recovery technique", 1995, OFC '95 Technical Digest, pp. 273-274 (Year: 1995).

Michael G. Taylor, "Coherent Detection Method Using DSP for Demodulation of Signal and Subsequent Equalization of Propagation Impairments," IEEE Photonics Technology Letters, vol. 16, No. 2, Feb. 2004, pp. 674-676.

(56) References Cited

OTHER PUBLICATIONS

K. Roberts, et al., "Performance of dual-polarization QPSK for optical transport system," JLT, vol. 27, No. 16, pp. 3546-3559, Aug. 2009.

S.J. Savory et al., "Digital equalisation of 40Gbit/s per wavelength transmission over 2480km of standard fibre without optical dispersion compensation," European Conference on Optical Communications (ECOC) 2006, paper Th2.5.5.

H. Sun et al., "Real-time measurements of a 40 Gb/S coherent system," Jan. 21, 2008, vol. 16, No. 2, Optics Express, pp. 873-879.

Greshishchev et al., "A 56GS/s 6b DAC in 65nm CMOS with 256x6b Memory", ISSCC 2011/Session 1 O/Nyquist-Rate Converters/1 0.8, 2011 IEEE International Solid-State Circuits Conference, 3 pages.

Bingham, "Multicarrier Modulator for Data Transmission: An Idea Whose Time Has Come", IEEE Communications Magazine, pp. 5-14, May 1990, 8 pages.

Yan et al. "Experimental Comparison of No-Guard-Interval-OFDM and Nyquist-WDM Superchannels", OFC/NFOEC Techincal Digest, Jan. 23, 20212, 4 pages.

Zhuge et al., "Comparison of Intra-Channel Nonlinearity Tolerance Between Reduced-Guard-Interval CO-OFDM Systems and Nyquist Single Carrier Systems", OFC/NFOEC Technical Digest, Jan. 23, 2012, 4 pages.

Zhang et al., "3760km, 100G SSMF Transmission over Commercial Terrestrial DWDM ROADM Systems using SD-FEC", OFC/NFOEC Postdeadline Papers, Mar. 2012, 3 pages.

Rahn et al., "250Gb/s Real-Time PIC-based Super-Channel Transmission Over a Gridless 6000km Terrestrial Link", OFC/NFOEC Posteadline Papers, Mar. 2012, 3 pages.

\* cited by examiner

US 11,743,621 B2

NETWORK SWITCHES SYSTEMS FOR OPTICAL COMMUNICATIONS NETWORKS

CROSS REFERENCE TO RELATED APPLICATIONS

This application claims the benefit of U.S. Provisional Patent Application No. 62/913,354, filed Oct. 10, 2019, which is incorporated herein by reference in its entirety.

TECHNICAL FIELD

This disclosure relates to optical communications networks.

BACKGROUND

In an optical communications network, network nodes (e.g., computer devices) can exchange information using one or more of optical links (e.g., lengths of optical fiber) extending between them. For example, a first network node and a second network node can be interconnected by one or more optical links. The first network node can transmit data to the second network node by generating an optical signal, modulating the optical signal based on the data (e.g., using one more optical subcarriers), and transmitting the optical signal over the one or more optical links. The second node can receive the optical signal from the one or more optical links, and demodulate the optical signal to recover the data.

SUMMARY

In an aspect, an apparatus is provided that comprises a first chip including first circuitry, wherein the first chip is configured to be communicatively coupled to a first network device, and wherein the first chip is configured to: receive, from a plurality of second network devices via the first network device, a plurality of data streams to be transmitted to a plurality of third network devices over an optical communications network; identify, for each one of the data streams, a different respective subset of optical subcarriers for transmitting that data stream; and transmit each one of the data streams to a respective one of the third network devices over the optical communications network, wherein each of the data streams is transmitted using the different respective subset of optical subcarriers.

Other implementations are directed to systems, devices, and non-transitory, computer-readable media having instructions stored thereon, that when executed by one or more processors, cause the one or more processors to perform operations described herein.

The details of one or more implementations are set forth in the accompanying drawings and the description below. Other features and advantages will be apparent from the description and drawings, and from the claims.

BRIEF DESCRIPTION OF THE DRAWINGS

Like reference numbers and designations in the various drawings indicate like elements.

Like reference numbers and designations in the various drawings indicate like elements.

DETAILED DESCRIPTION

Figure 1:
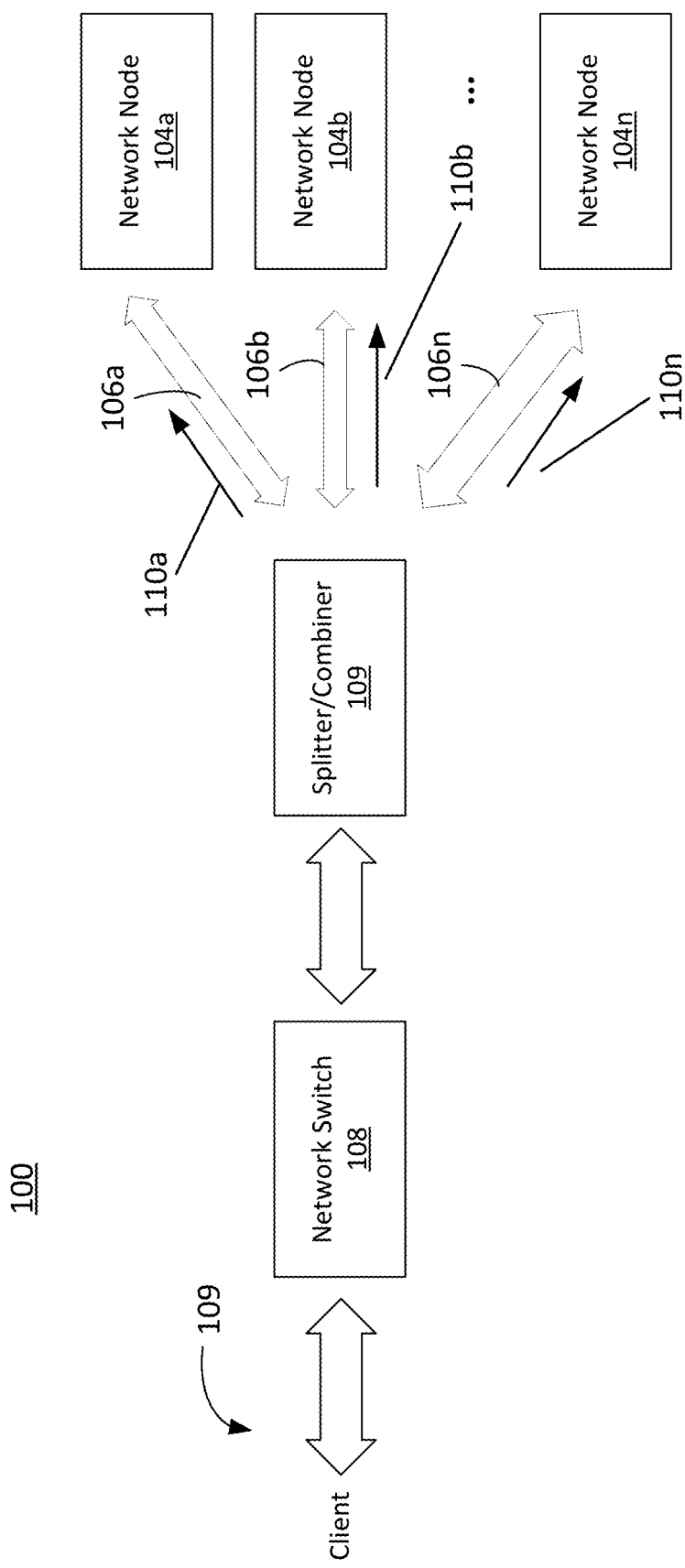
FIG. 1 is a diagram of an example optical communications network.

The present disclosure describes network switches for routing data on an optical communications network.

Optical subcarriers may be employed to transmit data in a point-to-multi-point network whereby a hub node including a network switch receives such data from a client and transmits information indicative of such data to multiple leaf or network nodes, where data intended for such leaf node is output. Often the rate at which data is supplied to the hub node is different than the rate at which information indicative of the data is transmitted. Moreover, the client data may have a format that is different than that associated with the transmitted information indicative of the client data. Consistent with the present disclosure, client data is inverse multiplexed to lower data rate streams and then multiplexed to a plurality of inputs, each of which corresponding to a respective optical subcarrier. Information indicative of the data may be allocated to multiple subcarriers, if the a single carrier lacks sufficient capacity or bandwidth to meet the bandwidth requirements of the leaf node. Buffer circuits may also be employed to "shape" or delay the outputs or flows of the multiplexer so that data is fed, for example, to a transmit portion of chip 200*b* of the network switch at a uniform rate rather than in non-uniform data bursts, which, under certain circumstances, could exceed the capacity of such transmit portion. In a further example, leaf nodes include circuitry for monitoring the amount of received data, and, if such received exceeds a certain threshold, a request is sent from the leaf node to the hub to transmit data at a rate equal to or substantially equal to the received data rate. As a result, symmetric data flows may be achieved whereby the leaf nodes transmit and receive data at the same or substantially the same rate.

In some implementations, an optical communications network can include network nodes (e.g., computer devices) that are interconnected by one or more optical links (e.g., lengths of optical fiber). A network node can transmit data to another node using one or more of the optical links. For example, a first network node can transmit data to a second network node by generating an optical signal, modulating the optical signal based on the data (e.g., using one more optical subcarriers), and transmitting the optical signal over one or more optical links extending between them. The second node can receive the optical signal from the one or more optical links, and demodulate the optical signal to recover the data.

In some implementations, an optical communications network also can include one or more network switches for routing data between network nodes. As an example, a network switch can receive data from one or more network nodes (e.g., in the form of data packets), ascertain the intended destination of each of the data packets (e.g., other network nodes on the optical communications network), and route each of the data packets to its intended destination.

In some implementations, a network switch can route data by generating optical signals that are modulated according to one or more optical subcarriers that are associated with the intended destination or destinations of the data. For example, a network switch can receive data packets from one or more network nodes, ascertain the intended destination of each of the data packets, and identify one or more respective optical subcarriers that can be used to transmit data to each of those destinations. Based on this information, the network switch can generate one or more optical signals, modulate the optical signals according to the identified optical subcarriers, and transmit the modulated optical signals over one or more optical links to each of the intended destinations.

As an example, a network switch can receive a first set of data packets intended for a first network node and a second set of data packets intended for a second network node. Further, the network switch can identify a first optical subcarrier that is allotted for transmitting data to the first network node, and a second optical subcarrier that is allotted for transmitting data to the second network node. Based on this information, the network switch can generate a first optical signal, modulate the first optical signal based on the first data and according to the first optical subcarrier, and transmit the first optical signal to the first network node. Further, the network switch can generate a second optical signal, modulate the second optical signal based on the second data and according to the second optical subcarrier, and transmit the second optical signal to the second network node. The first network node and the second network node can demodulate the respective optical signals to recover the data.

Further, in some implementations, a network switch can generate an optical signal that is modulated to include multiple sets of optical subcarriers, where each set of optical subcarriers, including one or more optical subcarriers, is associated with a different intended destination for data. Each of the intended destinations can receive an instance of the optical signal (e.g., a respective power-divided instance of the optical signal), and selectively demodulate the optical signal to selectively process the set of optical subcarriers to which it is associated (e.g., to recover the data that is intended for it). Further, each of the intended destinations can selectively ignore, block, or otherwise not demodulate or process those sets of optical subcarriers to which it is not associated (e.g., such that it refrains from recovering or outputting the data that is not intended for it).

As an example, a network switch can receive a first set of data packets intended for a first network node and a second set of data packets intended for a second network node. Further, the network switch can identify a first optical subcarrier that is allotted for transmitting data to the first network node, and a second optical subcarrier that is allotted for transmitting data to the second network node. Based on this information, the network switch can generate an optical signal, modulate the optical signal based on the first data to provide a first optical subcarrier, and modulate the optical signal based on the second data and provide the second optical subcarrier. Further, the network switch can transmit an instance of the optical signal (e.g., a first power-divided instance of the optical signal) to the first network node and another instance of the optical signal (e.g., a second power-divided instance of the optical signal) to the second network node.

The first network node can demodulate or process the received optical signal to recover or output the first set of data packets associated with the first optical subcarrier. Further, the first network node can refrain from demodulating or processing the second optical subcarrier or otherwise not output packets associated with the second optical subcarrier. Similarly, the second network node can demodulate or process the received optical signal to recover or output the second set of data packets associated with the second optical subcarrier. Further, the second network node can refrain from demodulating or processing the first optical subcarrier or otherwise not output packets associated with the first optical subcarrier.

In some implementations, a network switch can establish data streams (e.g., a sequence of data) for transmitting data to network nodes, and allot particular amounts of network resources to each of the data streams. Further, each of the data streams can be associated with one or more respective optical subcarriers. As an example, a network switch can establish a first data stream for transmitting data to a first network node, and transmit data over that data stream according to a first set of optical subcarriers. Further, the network switch can allot a first set of network resources (e.g., a first amount of bandwidth) to the first data stream. Further, the network switch can establish a second data stream for transmitting data to a second network node, and transmit data over that data stream according to a second set of optical subcarriers. Further, the network switch can allot a second set of network resources (e.g., a second amount of bandwidth) to the second data stream.

Further, in some implementations, each of the data streams can be transmitted to multiple network nodes (e.g., using an optical signal modulated including multiple sets of optical subcarriers). Each of the network nodes can selectively recover or output the data stream that is intended for it (e.g., by demodulating the optical signal according to the set of optical subcarriers that is associated with the network node), while refraining from recovering or outputting the data streams that are intended for other network nodes.

Further still, the network switch can, in some implementations, dynamically adjust each of the data streams during operation. For example, if additional network nodes are coupled to the optical communications network, the network switch can establish additional data streams for those network nodes, associate respective sets of optical subcarriers with each of the additional data streams or change the bandwidth or capacity of individual optical subcarriers, and allot respective sets of network resources to each of the additional data streams. As another example, if network nodes are removed from the optical communications network, the network switch can remove the data streams associated with those network nodes or reduce the bandwidth or capacity of individual optical subcarriers, and reallot the optical subcarriers and/or network resources for the removed data streams to other data streams. As another example, the network switch can dynamically increase the number of optical subcarriers and/or the amount network resources (e.g., the bandwidth or capacity of individual optical subcarriers) that are allotted to or associated with certain data streams (e.g., to accommodate the transfer of a greater volume of data and/or the transfer of data according to a higher throughput to the corresponding network node). As another example, the network switch can dynamically reduce the number of optical subcarriers and/or the amount network resources e.g., the bandwidth or capacity of individual optical subcarriers) that are allotted to or associated with certain data streams (e.g., if the volume of data transmitted to the corresponding network node is sufficiently low and/or if the data can be transmitted according to a lower throughput, such that the optical subcarriers and/or network resources are better utilized elsewhere). This can be useful, for example, as it enables network sources to be used more efficiently on the optical communications network.

In some implementations, at least some of the subcarriers described herein can be Nyquist subcarriers. A Nyquist subcarrier is a group of optical signals, each carrying data, where (i) the spectrum of each such optical signal within the group is sufficiently non-overlapping such that the optical signals remain distinguishable from each other in the frequency domain, and (ii) such group of optical signals is generated by modulation of light from a single laser. In general, each subcarrier may have an optical spectral bandwidth that is at least equal to the Nyquist frequency, as determined by the baud rate of such subcarrier.

Example systems and techniques for routing data on an optical communications network are described in greater detail below and shown in the drawings.

I. Example Systems and Methods for Routing Data on an Optical Communications Network FIG. 1 shows an example optical communications network 100. The optical communications network 100 includes multiple network nodes 104-1-104-$n$ that are communicatively coupled to network switch 108 via a respective one of optical links 106-$a$-106$n$ and optical splitter and combiner 109. In some implementations, the optical communications network 100 can be a part of a mesh network or a ring network.

Each of the network nodes 104-1-104-$n$ can include one or more respective computer devices (e.g., server computers, client computers, etc.). In some implementations, the network nodes can be configured such that each of the network nodes transmits data to and/or receives data from one or more other network nodes. As an example, the network node 104$a$ can be configured to transmit data to and/or receive data from 104-$n$ network switch 108. In practice, an optical communications network 100 can include any number of network nodes greater than one (e.g., two, three, four, or more).

As shown in FIG. 1, the network nodes 104-1-104-$n$ are communicatively coupled to one another by optical splitter and combiner 109 a corresponding one of optical links 106-$a$-106$n$ extending between nodes 104-1-104-$n$ and optical switch 108. Each of the optical links 106 can be implemented using one or more lengths of optical fiber and/or equipment interconnecting the optical fiber (e.g., line system components), such as optical amplifiers. For upstream data transmission from network switch 108 to nodes 104-1-104-$n$, optical signals output from network switch 108 are power split by the power splitter portion of splitter and combiner 109, and each power split portion of the optical signal is supplied via a respective one of optical links 106-$a$-106$n$ to a corresponding one of network nodes 104-1-104-$n$. For downstream data transmission from nodes 104-1-104-$n$ to network switch 108, optical signals output from each network node 104-1-104-$n$ are supplied to the combiner portion of splitter and combiner 109, which combines the received optical signals and supplies such optical signals to optical switch 208.

As shown in FIG. 1, the network nodes 104-1-104-$n$ are also communicatively coupled to another by a network switch 108. The network switch 108 is configured to route data to/from 104-1-104-$n$ to a client. For example, the network switch 108 can receive data from a client via an and provide optical signals carrying information indicative of such data. The signals are power split as noted above and respective power split portions of the optical signals are supplied to corresponding one of nodes 1041 to 104-$n$. Each such node, in turn, is operable to output, based on the received power split portion, the client data intended for that node 104-$n$104-$n$ In some implementations, the network switch 108 can include multiple chips, each including respective circuitry that is configured to perform certain tasks. For example, as shown in FIG. 2$a$, the network switch 108 can include a first chip 200$a$ ("Chip A") and a second chip 200$b$ ("Chip B"). The first chip 200$a$ can include circuitry that is configured to transmit/receive to/from a client one or more data streams 202 containing respective data packets or data frames and route the data packets or frames to/from the second chip 200$b$ for further processing. Switch chip 200$a$ For ease of explanation, "data packets," as used herein, refers to data packets or data frames. In one example, switch chip 200$a$ includes inputs I-1 to I-n and outputs O-1 to O-n. Switch chip 200$a$ includes circuitry operable to switch data packets supplied to any one of inputs I-1 to I-n to any one of outputs O-1 to O-n. The circuitry in switch chip 200$a$ is also operable to multiplex, such as time division multiplex, data packets supplied to two or more of inputs I-1 to I-n and provide such multiplexed data packets to any one of outputs O-1 to O-n. Further, the circuitry in switch chip 200$a$ is operable to demultiplex a time division multiplexed stream of data packets and provided such demultiplexed data packets to one of inputs I-1 to I-n and supply such demultiplexed data packets to two or more of outputs O-1 to O-n. Switch chip 200$a$ is also operable to block transmission of data packets provided to one or more of inputs I-1 to I-n.

The second chip 200$b$ can include circuitry that is configured or operable to receive the data packets from one or more of outputs O-1 to O-n of first chip 200$a$, and process such packets for transmission of related data to respective destinations (e.g., one or more of the network nodes 104-1-104-$n$) 4. This can be beneficial, for example, as it enables the components of the network switch 108 to be implemented and/or replaced in a modular manner.

As further shown in FIG. 2$a$, outputs from Chip B may be supplied to an optical interface 200$c$, which based on such outputs, provides a modulated optical signal 204. In one example, modulated optical signal 204 includes a plurality of optical subcarriers. Each of the plurality of optical subcarriers is a Nyquist subcarrier, in a further example. Nyquist subcarriers are described in greater detail below.

As described above, in some implementations, the network switch 108 can establish multiple information or data streams intended for respective network nodes, where each data or information stream is associated with one or more respective optical subcarriers. As an example, the network switch 108 can establish a first data stream intended for a first network node, and transmit information indicative of the first data stream using a first subcarrier or first set of optical subcarriers. Further, the network switch can establish a second data stream intended for a second network node, and transmit information indicative of the second data stream using a second subcarrier or a second set of optical subcarriers.

Further, information indicative of each of the data streams can be transmitted to multiple network nodes (e.g., using an optical signal 204 modulated to include multiple sets of optical subcarriers). Based on such information, each of the network nodes can selectively output the data stream that is intended for it (e.g., by processing the information carried by a set of optical subcarriers intended for that network node), while refraining from outputting the data streams that are intended for other network nodes.

For example, referring to FIG. 1, the network switch 108 can generate an optical signal that is modulated to include multiple sets of optical subcarriers, where each set of optical subcarriers is associated with a different intended destination for data (e.g., a respective one of the network node 104-1-104-$n$). Further, the network switch 108 can transmit modulated optical signal 204 including a plurality of optical subcarriers to splitter/combiner 109, which provides respective power-divided portions of the modulatedoptical signal (e.g., optical signals 110-1-110-$n$) to each of the intended destinations. For example, if the total power of the modulated optical signal 204 is $P_{total}$, the power of each of the instances of the optical signal that are transmitted to the intended destinations 104-1-104-$n$ can be $P_1, P_2, \ldots, P_n$, respectively, where $P_{total} = P_1 + P_2 + \ldots + P_n$.

Further, each of the intended destinations can receive a respective instance of the optical signal 110-1-1-110-$n$, and selectively demodulate the optical signal to provide client data associated with the set of optical subcarriers to which the particular one of nodes 104-1-$n$ is associated (e.g., to recover the data that is intended for it). Further, each of the intended destinations can selectively ignore, block, or otherwise not demodulate the respective optical signal 110-1-110-$n$ information or data carried not intended for that node 104 and carried by other sets of optical subcarriers (e.g., such that it refrains from recovering or outputting the data that is not intended for it).

As further shown in FIG. 1, modulated optical signals may be output from each of network nodes 104$a$-104$n$, and each such modulated optical signal can include one or more optical subcarriers. In one example, the aggregate number of optical subcarriers supplied by each of nodes 104$a$ to 104$n$ in the upstream direction is equal to the number optical subcarriers output from network switch 108 in the downstream direction.

Figure 3:
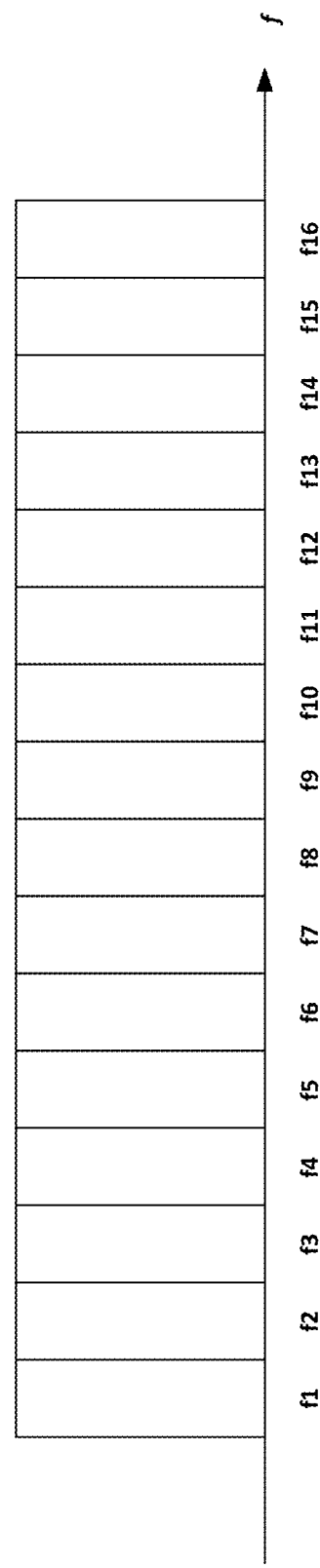
FIG. 3 is a power spectral density plot showing example optical subcarriers.

FIG. 3 shows example of a power spectral density plot associated with optical subcarriers SC1-SC16, included in modulated optical signal 204 in the downstream direction from network switch 108 to network nodes 104$a$ to 104$n$, that may be made available for use or output by the network switch 108. In this example, the optical subcarriers SC1-SC16 are output from optical interface 200$c$ and carry data or information from the network switch 108 (e.g., the second chip 200$b$) to one or more network nodes (e.g., one or more of the network nodes 102$a$-102$n$ and 104-1-104-$n$). Here, each of optical subcarriers SC1-SC16 has a respective one of frequencies f1-f16. In a further example, FIG. 3 also illustrates the power spectral density associated with optical subcarriers received from network nodes 104$a$-104$n$.

In some implementations, each of the data streams can be associated with a single respective optical subcarrier. As an example, the network switch 108 can establish 16 data streams for transmitting information indicative of the data to 16 respective network nodes, and each data stream can be associated with a single respective optical subcarrier (e.g., SC1, SC2, SC3, etc.).

In some implementations, each of the data streams can be associated with multiple respective optical subcarriers. As an example, the network switch 108 can establish four data streams for transmitting information indicative of the data to four respective network nodes. A first data stream can be associated with eight optical subcarriers (e.g., SC1-SC8), a second data stream can be associated with four optical subcarriers (e.g., SC9-12), a third data stream can be associated with two optical subcarriers (e.g., SC13 and SC14), and fourth data stream can be associated with two optical subcarriers (e.g., SC15 and SC16).

In some implementations, some of the data streams can be associated with single respective optical subcarriers, and other ones of the data streams can be associated with multiple respective optical subcarriers. As an example, the network switch 108 can establish six data streams for transmitting information indicative of data to four respective network nodes. A first data stream can be associated with eight optical subcarriers (e.g., SC1-SC8), and a second data stream can be associated with four optical subcarriers (e.g., SC9-12). Further, each of a third data stream, a fourth data stream, a fifth data stream, and a sixth data stream can be associated with a single respective optical subcarrier (e.g., SC13-SC16, respectively).

In the example shown in FIG. 3, the optical subcarriers that are used by the network switch 108 to transmit data are spectrally contiguous with one another with respect to the frequency domain. For example, each of the optical subcarriers can be associated with a respective frequency or frequency range. Further, these frequencies or frequency ranges can collectively span a particular continuous range of frequencies.

In some implementations, at least some of the optical subcarriers can be spectrally separated from one another. For example, a first optical subcarrier can be associated with a first frequency or frequency range, and a second optical subcarrier can be associated with a second frequency or frequency range. Further, a third frequency or frequency range can be positioned spectrally between (i) the first frequency or frequency range and (ii) the second frequency or frequency range. In some cases, the third frequency or frequency range may be referred to as a "guard band." In another example, frequency or spectral gaps (e.g., guard bands) may be provided between one or more adjacent pairs of adjacent subcarriers. Namely, a frequency or spectral gap may be provided between subcarriers SC9 and SC10, as well as between subcarriers SC3 and SC4. Moreover, the spectral gap between one pair of adjacent subcarriers may be different than the spectral gap between another pair of adjacent subcarriers.

In some implementations, at least some of the subcarriers described herein can be Nyquist subcarriers. A Nyquist subcarrier is a group of optical signals, each carrying data, where (i) the spectrum of each such optical signal within the group is sufficiently non-overlapping such that the optical signals remain distinguishable from each other in the frequency domain, and (ii) such group of optical signals is generated by modulation of light from a single laser. In general, each subcarrier may have an optical spectral bandwidth that is at least equal to the Nyquist frequency, as determined by the baud rate of such subcarrier.

Although FIG. 3 shows an example power spectral density plot of optical subcarriers SC1 to SC16 having a respective one of frequencies f1 to f16, this is merely an illustrative example of the optical subcarriers that may be output from and received by network switch 108. In practice, any number of optical subcarriers can be use by a network switch 108 to transmit/receive data to/from any number of network nodes. Further, some, none, or all of optical subcarriers can be spectrally contiguous with one another with respect to the frequency domain. Further, some, none, or all of optical subcarriers can be spectrally separated from one another with respect to the frequency domain (e.g., such that one or more guard bands are positioned spectrally between adjacent optical subcarriers in the frequency domain). In the example shown in FIG. 3, m=16 optical subcarriers are shown. It is understood that more or fewer optical subcarriers may be provided consistent with the present disclosure.

Figure 2A:
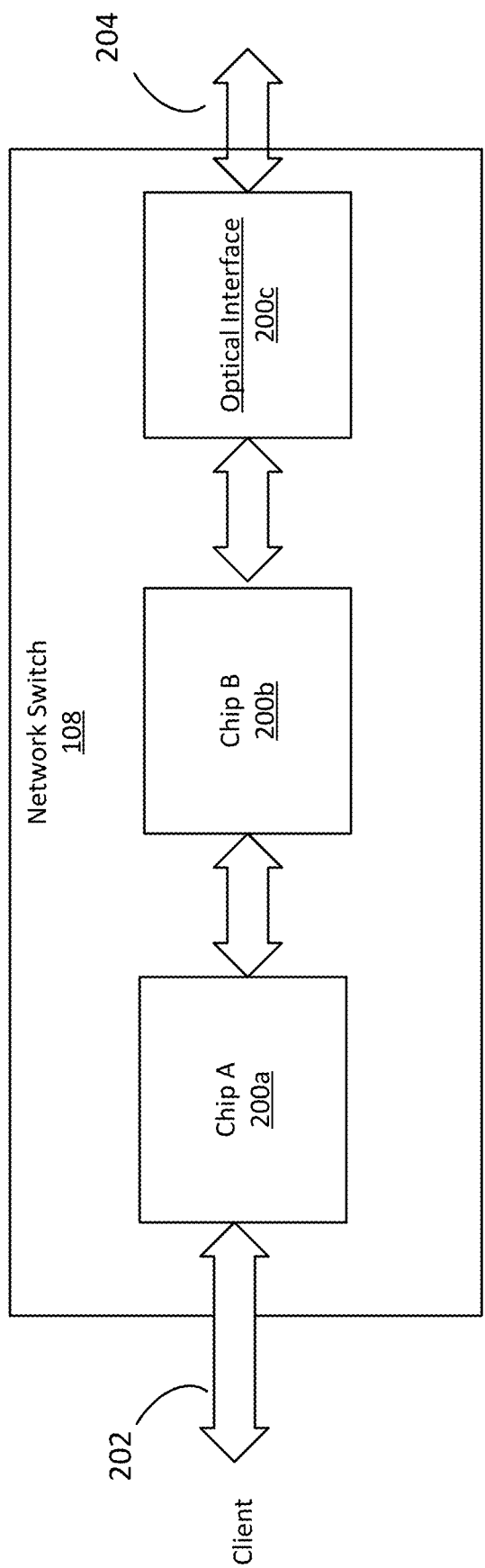
FIG. 2*a* is a diagram of an example network switch.
Figure 2B:
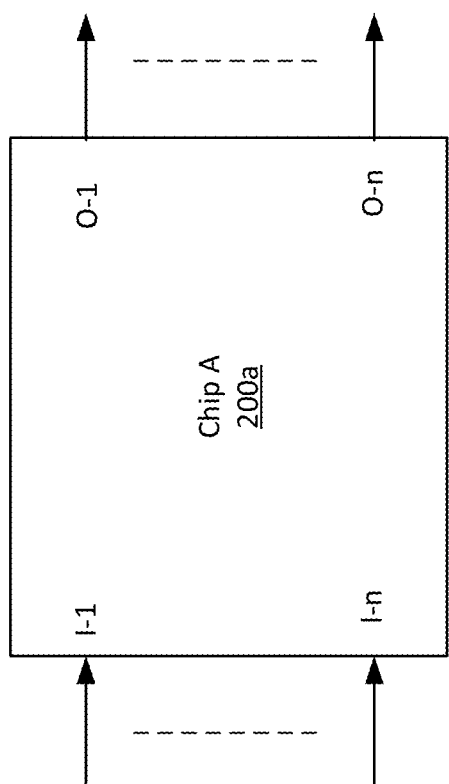
FIG. 2*b* shows a diagram of a chip included in the network switch shown in FIG. 2*a*.

As shown in FIG. 2a, a network switch 108 can include multiples chips (e.g., a first chip 200a and a second chip 200b) that transmit and/or receive data. In some implementations, at least some of the chips can transmit and/or receive data using one or more Serializer/Deserializer (SerDes) interfaces, which are typically electrical interfaces that transmit or receive data or information in the electrical domain between chips 200a and 200b. A SerDes may also be provided to receive/transmit data from/to a client.

Figure 4:
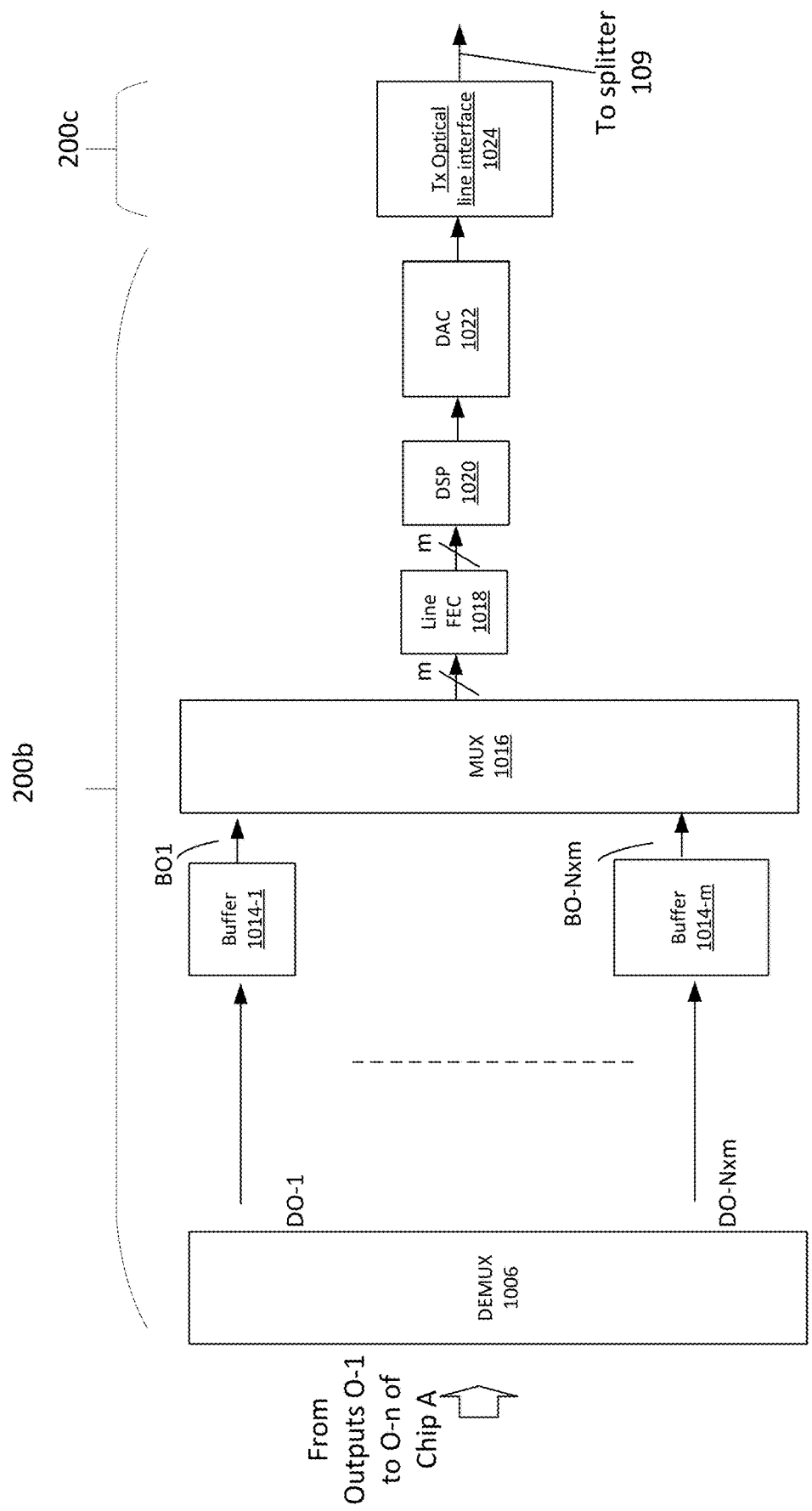
FIG. 4 is a diagram of an example of a transmit portion of a network switch.

FIG. 4 shows an example of a transmit portion the second chip 200b ("Chip B") of network switch 108 in greater detail. The components shown in FIG. 4 can be implemented, for example, in conjunction with the network switch 108.

As shown in FIG. 4, the second chip 200b includes demultiplexer 1006 that receives data packets or flows supplied from outputs O-1 to O-n of switch chip 200a. In one example, the data packets or flows are mapped by demultiplexer 1006 into a plurality of data stream or flows that have a lower data rate than the rate associated with the flows provided by outputs O-1 to O-n. In a further example, 50Gigabit Ethernet (GE), 100GE, 200GE & 400GE data flows may be input to demultiplexer 1006, and may be demultiplexed into lower rate flows of 25GE flows. A 25GE flow may also be input to demultiplexer 1006 and be output at the same 25GE rate. Table 1 below lists the GE flow that are supported consistent with an aspect of the present disclosure and the corresponding lower rate flows output by demultiplexer 1006.

TABLE 1

| Input Flow | Number of 25GE Output Flows |
|---|---|
| 25GE | 1 |
| 50GE | 2 |
| 100GE | 4 |
| 200GE | 8 |
| 400GE | 16 |

In another example, up-to m×N×25 Gbit ("G") lower rate or granular flows can be output from demultiplexer 1006. Such granular flows are extracted from FlexE compliant flows input to demultiplexer 1006. In a further example or up-to m×N×25G granular flows are extracted from based on demultiplexer 1006 input L2 function-compliant flows. The granular or lower rate flows are asynchronously mapped and multiplexed or combined by multiplexer 1016 into multiple 1.25 G time slots per flow, for example. Such mapping & inverse multiplexing decouples the client/flow rate/bandwidth with the line rate/bandwidth, which allows various clients/flows all asynchronous to each other to be carried over a set of m sub-carriers, for example. The 1.25 G granular times lots are further interleaved in multiplexer 1016 to match the optical subcarrier bandwidth before being output to line Forward Error Correction (FEC) circuit 1018. Each client/flow may be associated with or mapped to one or more optical subcarriers based on the bandwidth of the client/flow and the optical subcarrier, as discussed in greater detail below.

Buffer or memory circuits 1014-1 to 1014-$m$, for example, are provided to temporarily store or queue data output from demultiplexer 1006. Often, the output from demultiplexer may be bursty, such that during some instances, relatively little data is output, and at other instances a significant amount of data. Buffer circuit 1014, as noted above, temporarily store such data and output the data at a uniform rate over time to demultiplexer 1016. Buffer circuits 1014 can queue data for transmission according to various scheduling policies, such as FIFO, LIFO, SJN, QoS prioritization, and/or any other scheduling policy. In some implementations, the queueing of data can be controlled, at least in part, by a remote schedule module (e.g., the remote schedule module 908 described below with reference to FIG. 9).

As further shown in FIG. 4, multiplexer 1016 receives buffer outputs BO1 to BO-Nxm and supplies m outputs, which in one example, is the number of optical subcarriers. Input data to line FEC 1018 based on such outputs is encoded and output as FEC frames. In the example shown in FIG. 4, such FEC frames are next supplied to a digital signal processor (DSP) 1020, which, based on the FEC frames, generates digital signal or data outputs. Based on such digital outputs, digital-to-analog converter (DAC) circuitry 1022 outputs analog signals or voltages to Tx optical interface 1024 included in optical interface 200c.

Figure 5:
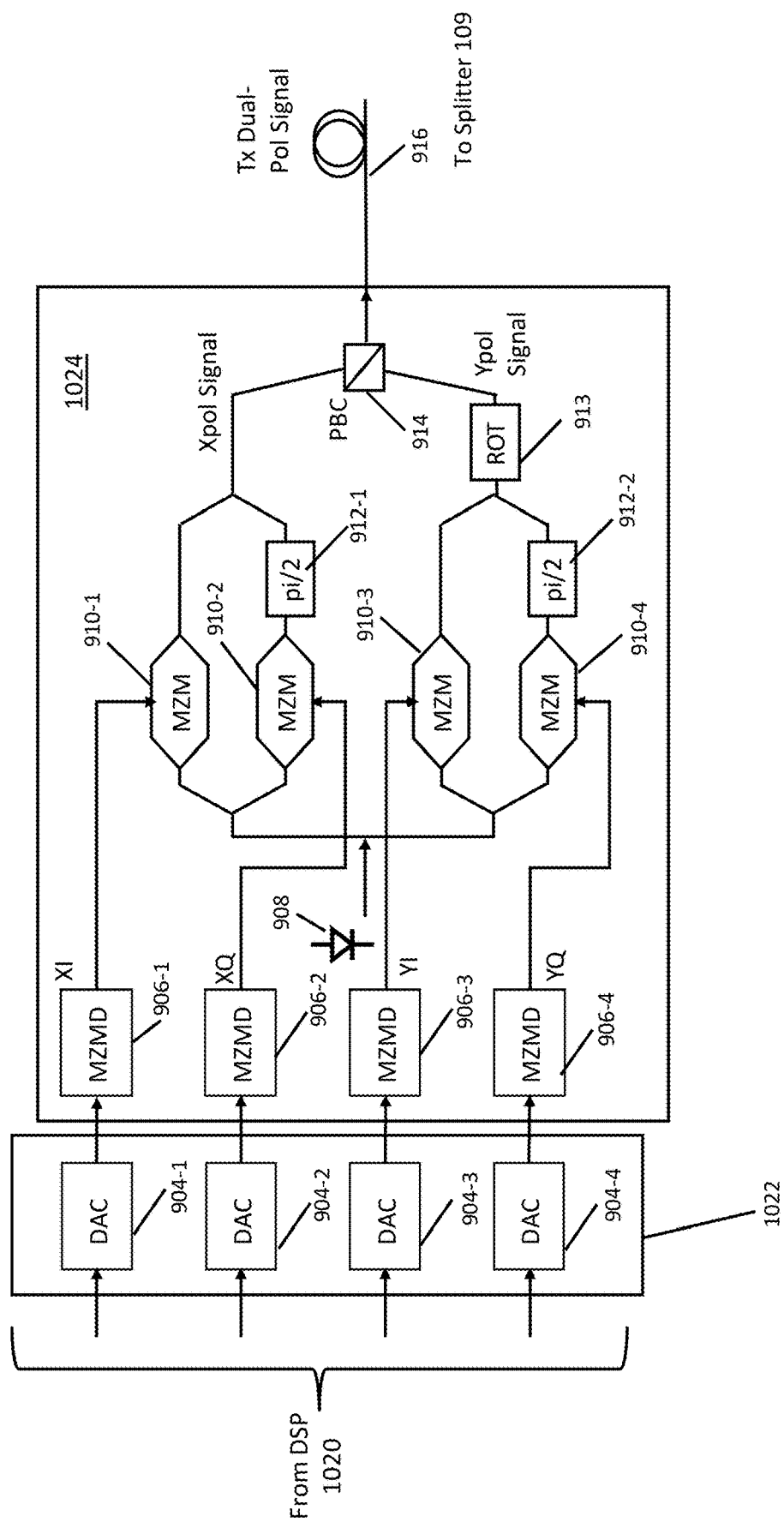
FIG. 5 is a diagram of an example of a receive portion of a network switch.

Tx Optical interface 1024 is shown in greater detail in FIG. 5. As noted above, digital signals or data are supplied to digital-to-analog conversion circuits 904-1 to 904-4 of DAC circuitry 1022. As further shown in FIG. 5, Tx optical interface 1024 also includes modulator driver circuitry 906 ("driver circuits 906") corresponding to each of Mach-Zehnder modulator driver (MZMD) 906-1, 906-2, 906-3, and 906-4. Each of driver circuits 906 is operable to output third electrical signals based on the second electrical signals output by each of the DAC 904.

The D/A and optics block 901 includes optical modulator circuitry 910 ("modulator 910") corresponding to each of MZM 910-1, 910-2, 910-3, and 910-4. Each of modulators 910 is operable to supply or output first and second modulated optical signals based on the third electrical signals. The first modulated optical signal includes multiple optical subcarriers 300 carrying user data and is modulated to include control data to be transmitted between nodes of system 100, and the second modulated optical signal is, for example, polarization modulated, such as polarization shift-keyed (PolSK), based on the second (control) data. Generation and detection of the second modulated optical signal is described in further detail below with respect to FIGS. 10-17.

In one example, each of the modulators 910-1 to 910-4 is a Mach-Zehnder modulator (MZM) that modulates the phase and/or amplitude of the light output from laser 908. Collectively, modulators 910 may also be constitute a modulator. As further shown in FIG. 5, a light or optical signal output from laser 908 (also included in block 901) is split such that a first portion of the light is supplied to a first MZM pairing including MZMs 910-1 and 910-2 and a second portion of the light is supplied to a second MZM pairing including MZMs 910-3 and 910-4.

The first portion of the light is further split into third and fourth portions, such that the third portion is modulated by MZM 910-1 to provide an in-phase (I) component of an X (or TE) polarization component of a modulated optical signal, and the fourth portion is modulated by MZM 910-2 and fed to phase shifter 912-1 to shift the phase of such light by 90 degrees in order to provide a quadrature (Q) component of the X polarization component of the modulated optical signal.

Similarly, the second portion of the light is further split into fifth and sixth portions, such that the fifth portion is modulated by MZM 910-3 to provide an I component of a Y (or TM) polarization component of the modulated optical signal, and the sixth portion is modulated by MZM 910-4 and fed to phase shifter 912-2 to shift the phase of such light by 90 degrees to provide a Q component of the Y polarization component of the modulated optical signal.

The optical outputs of MZMs 910-1 and 910-2 are combined to provide an X polarized optical signal including I and Q components and fed to a polarization beam combiner (PBC) 914 provided in block 901. In addition, the outputs of MZMs 910-3 and 910-4 are combined to provide an optical signal that is fed to polarization rotator 913, further provided in block 901, that rotates the polarization of such optical signal to provide a modulated optical signal having a Y (or TM) polarization. The Y polarized modulated optical signal is also provided to PBC 914, which combines the X and Y polarized modulated optical signals to provide a polarization multiplexed ("dual-pol") modulated optical signal onto optical fiber 916 corresponding to a fiber output to splitter 109. In some examples, optical fiber 916 may be included as a segment of optical fiber in an example optical communication path of system 100.

In some implementations, the modulated optical signal output from Tx optical interface 1024 includes subcarriers SC1-SC16 (of FIG. 3), for example, such that each data subcarrier 300 has X and Y polarization components and I and Q components.

Referring back to FIG. 1, the modulated optical signal, including optical subcarriers SC1 to SC16, for example, is provided to optical splitter 109, which power splits, in the upstream direction, the received optical signal and supplies a portion of the modulated optical signal including each of subcarriers SC1 to SC16 to each of network nodes 104a to 104n. Circuitry in each of such nodes processes the received optical signal and outputs data intended for that node, the data being associated with one or more of the optical subcarriers included in the modulated optical signal.

Downstream transmission from network switch 108 to network nodes 104 has been described above. Receipt and processing of upstream optical signals or optical subcarriers output from network nodes 104 will next be described with reference to FIGS. 6 and 7.

Figure 6:
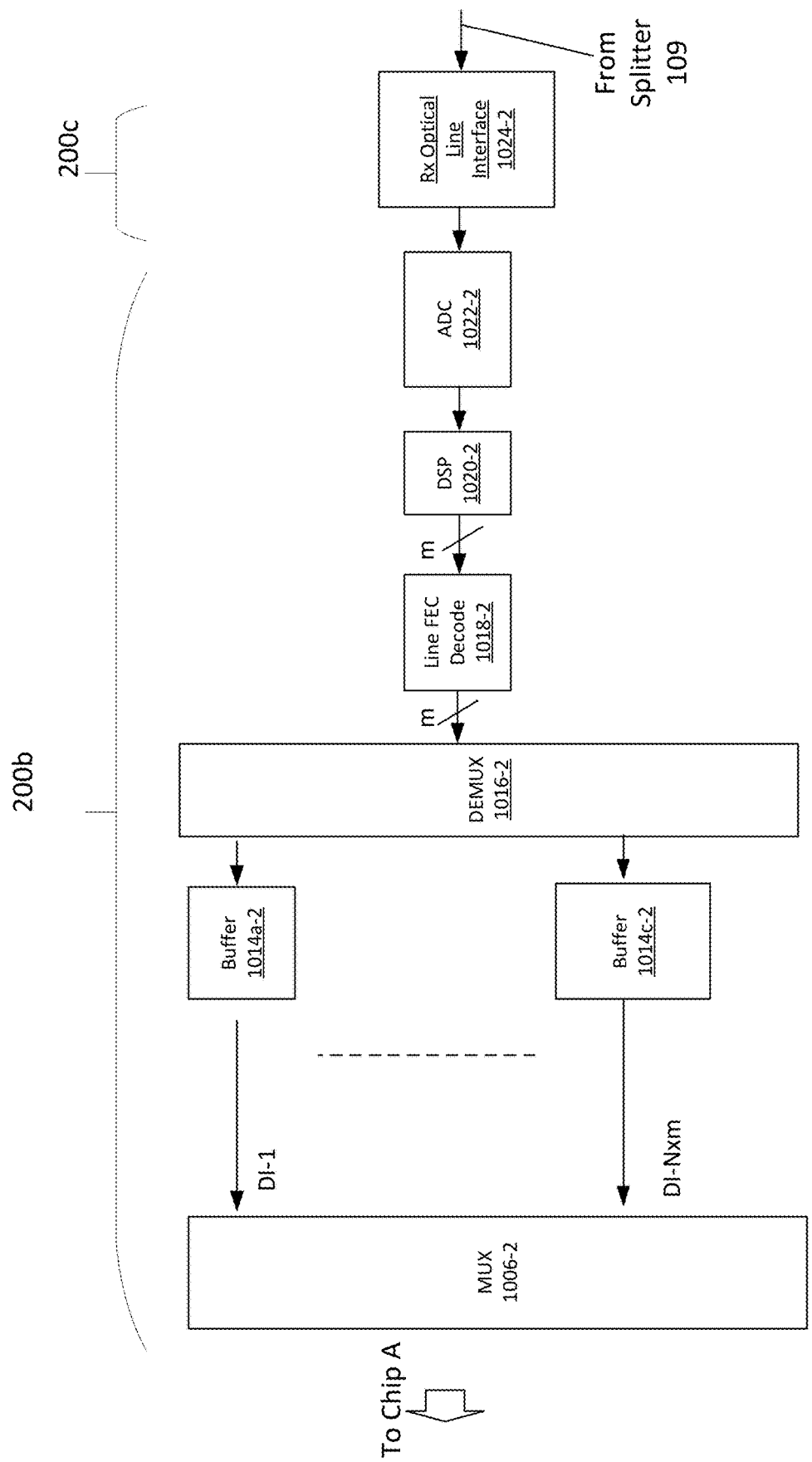
FIG. 6 shows an example of a transmitter included in optical interface consistent with the present disclosure.

As noted above, each or network or leaf nodes supplies a modulated optical signal including at least one optical subcarrier. In one example, the number of optical subcarrier(s) output from each leaf node is equal to the number of upstream optical subcarriers associated with or designated for each such leaf node. The optical subcarriers supplied from each leaf node are combined in the combiner portion of element 109 shown in FIG. 1 and provided to a receiver portion of chip 200b network switch 108, an example of which is shown in FIG. 6. Typically, the number of combined subcarriers output from the combiner in element 109 is m (e.g. m=16) will have a power spectral density similar to that shown in FIG. 3. In a further example, each such upstream subcarrier has a corresponding one of frequencies f1 to f16.

Receive portion of chip 200b includes an Rx optical line interface 1024-2 that receives an optical signal including the optical subcarriers output from each of the leaf nodes 104. Rx optical line interface 1024-2 will next be described with reference to FIG. 7.

Rx optical line interface 1024-2, in conjunction with DSP 1020-2, may carry out coherent detection. Rx optical line interface 1024-2 may include a polarization beam splitter 1105 with first and second outputs, a local oscillator (LO) laser 1110, 90 degree optical hybrids or mixers 1120-1 and 1120-2 (referred to generally as hybrid mixers 1120 and individually as hybrid mixer 1120), detectors 1130-1 and 1130-2 (referred to generally as detectors 1130 and individually as detector 1130, each including either a single photodiode or balanced photodiode), and AC coupling capacitors 1132-1 and 1132-2.

In one example, one laser may be provided that is "shared" between the transmitter and receiver portions in transceivers 106 and/or transceivers 108. For example, a splitter can provide a first portion of light output from laser 908 to the MZMs 910 in the Tx optical line interface 1024. Further, the splitter can provide a second portion of such light acting as a local oscillator signal fed to 90 degree optical hybrids 1120 in the Rx optical line interface 1024-2. In that case example, laser 1110 may be omitted.

Rx optical line interface 1024-2 also includes transimpedance amplifiers/automatic gain control circuits 1134 ("TIA/AGC 1134") corresponding to TIA/AGC 1134-1 and 1134-2, analog-to-digital conversion circuitry 1022-2 corresponding collectively to ADCs 1140-1 and 1140-2. ADCs 1140-1 and 1140-2 may be referred to generally as ADCs 1140 and individually as ADC 1140.

Polarization beam splitter (PBS) 1105 may include a polarization splitter that receives an input polarization multiplexed optical signal including optical subcarriers SC1 to SC16 supplied by optical fiber link 1101 from the splitter 109 and leaf nodes 104, which may be, for example, an optical fiber segment as part of one of optical communication paths of system 100. PBS 1105 may split the incoming optical signal into the two X and Y orthogonal polarization components. The Y component may be supplied to a polarization rotator 1106 that rotates the polarization of the Y component to have the X polarization. Hybrid mixers 1120 may combine the X and rotated Y polarization components with light from local oscillator laser 1110. For example, hybrid mixer 1120-1 may combine a first polarization signal (e.g., the component of the incoming optical signal having a first or X (TE) polarization output from a first port of PBS 1105) with light from local oscillator laser 1110, and hybrid mixer 1120-2 may combine the rotated polarization signal (e.g., the component of the incoming optical signal having a second or Y (TM) polarization output from a second port of PBS 1105) with the light from local oscillator laser 1110.

Detectors 1130 may detect mixing products output from the optical hybrids, to form corresponding voltage signals, which are subject to AC coupling by capacitors 1132-1 and 1132-2, as well as amplification and gain control by TIA/AGCs 1134-1 and 1134-2. In some implementations, the TIA/AGCs 1134 are used to smooth out or correct variations in the electrical signals output from detector 1130 and AC coupling capacitors 1132.

Figure 7:
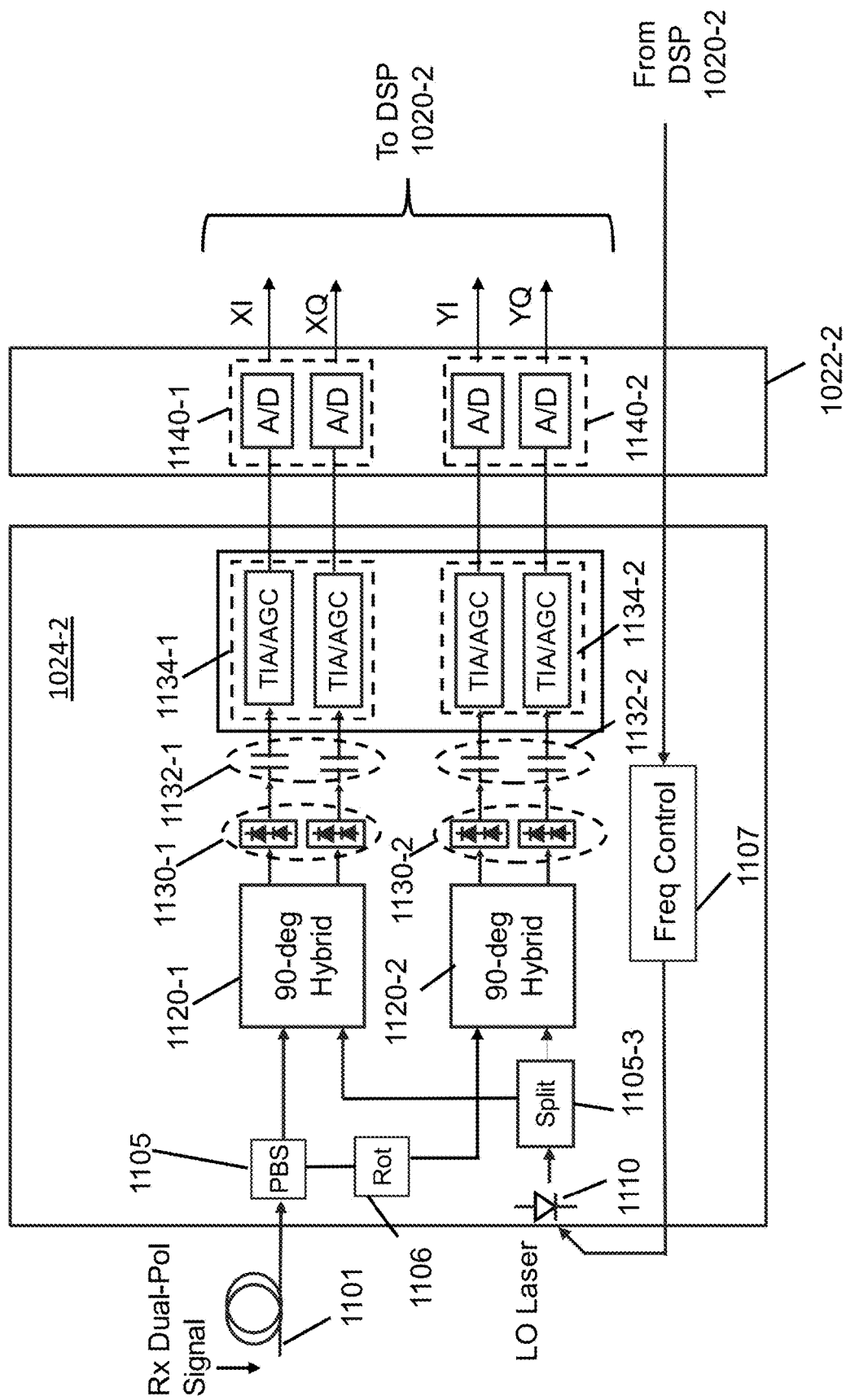
FIG. 7 shows an example of a receiver included the optical interface further consistent with the present disclosure.

As further shown in FIG. 7, the outputs of TIA/AGCs 1134-1 and 1134-2 are supplied to ADCs 1140 of ADC circuitry 1022-2, which convert the outputs of the TIA/AGCs, which are analog voltage signals, for example, to digital samples or digital signals or data. Namely, two detectors or photodiodes 1130-1 may detect the X polarization signals to form the corresponding voltage signals, and a corresponding two ADCs 1140-1 may convert the voltage signals to digital samples associated with the first polarization signals after amplification, gain control and AC coupling. Similarly, two detectors 1130-2 may detect the rotated Y polarization signals to form corresponding voltage signals, and a corresponding two ADCs 1140-2 may convert such voltage signals to digital samples associated with the second polarization signals (Y polarization) after amplification, gain control and AC coupling. DSP 1020-2 may process the digital samples associated with the X and Y polarization components to output data associated with subcarriers SC1 to SC16 from the leaf nodes 104.

While FIGS. 4-7 show optical receiver and transmit portions as including a particular quantity and arrangement of components, in some implementations, the receiver and transmit portions may include additional components, fewer components, different components, or differently arranged components. The quantity of detectors 1130 and/or ADCs 1140 may be selected to implement Rx optical line interface that is capable of receiving and detecting a polarization-multiplexed signal. In some instances, one of the components illustrated in FIGS. 4-7 may carry out a function described herein as being carry outed by another one of the components illustrated in these figures.

Returning to FIG. 6, the outputs form DSP 1020-2, which, in one example are m such outputs, are fed to line FEC decoder circuit to correct errors that may have occurred during transmission and decode the encoding carried out by FEC encoder 1018. As shown in the example depicted in FIG. 6, m outputs (e.g., m=16) are output to demultiplexer 1016-2 that output granular data flows or lower rate flows similar to those noted above to a corresponding one of buffers 1014a-1 to 1014a-m, which queue the received data in a manner similar to that described above in order to provide a uniform output of data over time to inputs DI-1 to DI-Nxm of multiplexer 1006-2. Multiplexer 1006-2, in turn multiplexes the lower rate/granular data flows into data flows, such as GE flows noted above, to be received by and output to the client via switch chip 200a.

It is noted that the connections between the transmit and receive portions of chips 200b and switch chip 200a may be via a Serdes. In addition, the physical connections may be realized or implemented with wires, traces, etc. such signals can be exchanged between chips 200a and 200b.

Further details of the line FEC encode and decode will next be described. The line FEC 1018 encodes the data in each of the time slots along with parity information (e.g., an error correcting code, ECC) for controlling errors in the encoded data. The parity information can be used, for example, to provide redundant information regarding the encoded data, such that the recipient of the data can reconstruct the data despite unreliable and/or noisy line conditions. In some implementations, the parity information can include block codes or bits, convolutional codes or bits, repetition codes or bits, and/or other codes or bits generated according to any FEC scheme. The line FEC module 1018 provides the encoded data to a digital signal processor (DSP) 1020 for further processing.

The DSP 1020 receives the encoded data from the line module 1018, and generates drive signals for producing an optical signal using a Tx optical line interface 1024. For example, the DSP 1020 can include one or more bits-to-symbol circuits that map encoded bits of data to symbols on a complex plane in accordance with a particular modulation format for each subcarrier. Further, each of the symbols output from the bit-to-symbol circuits can be supplied to a respective overlap and save buffer. Each of the overlap and save buffers can combine some or all of the symbols, and output the combined symbols to a fast Fourier transform (FFT) circuit. The FFT circuit can convert the received symbols to the frequency domain (e.g., using a fast Fourier transform), and provide the converted symbols to one or more switches blocks 1121a-1121p (which may be referred to collectively as bins and switches blocks. Each of the bins and switches blocks can include, for example, memories or registers (e.g., frequency bins (FB) or points), that store frequency components associated with each optical subcarrier.

Further, replicator components or circuits can replicate the contents of the frequency bins FB and store such contents (e.g., for T/2 based filtering of the subcarrier) in a respective one of the plurality of replicator components. Such replication can increase the sample rate. In addition, the replicator components or circuits can arrange or align the contents of the frequency bins to fall within the bandwidths associated with pulse shaped filter circuits, as described below.

Each of the pulse shape filter circuits can apply a pulse shaping filter to the data stored in the frequency bins of a respective one of the replicator components or circuits to thereby provide a respective one of a plurality of filtered outputs, which are multiplexed and subject to an inverse FFT. The pulse shape filter circuits can calculate the transitions between the symbols and the desired subcarrier spectrum so that the subcarriers can be packed together spectrally for transmission (e.g., with a close frequency separation). The pulse shape filter circuits can also may be used to introduce timing skew between the subcarriers to correct for timing skew induced by links between network nodes. Further, a multiplexer component can receive the filtered outputs from the pulse shape filter circuits, and multiplex or combine such outputs together to form an element vector.

Further, an IFFT circuit or component can receive the element vector and provide a corresponding time domain signal or data based on an inverse fast Fourier transform (IFFT). In one example, the time domain signal can have a rate of 64 GSample/s. Further, a take last buffer or memory circuit can select the last N samples from an output of the IFFT component or circuit and supply the samples to one or more DACs 1022.

The DAC 1022 convers the digital signal received from the DSP 1020 into an analog signal, and provides the analog signal to the Tx line module 1024, which a modulated optical signal based on the received analog signal, as described above. As further noted above, a laser driver of the transmission module 1024 can generate optical signals based on the analog signals. The optical signals can be provided to one or more modulators (e.g., one or more Mach-Zehnder modulators, MZMs) that modulate the optical signals according to one or more optical subcarriers (e.g., one or more optical subcarriers SC1-SC16).

As an example, the first chip 200a of the network switch 108 can receive data from a client or transmit data to the client via a first set of SerDes interfaces. In one example, first chip 200a and the second chip 200b can exchange data via a second set of SerDes interfaces. Further, the second chip 200b can be used in connection with transmission of data or information to one or more network nodes (e.g., to one or more of the network nodes 102a-102n and 104-1-104-n) via a third set of SerDes interfaces.

In some implementations, at least some of the sets of SerDes interfaces can include a single respective SerDes interface. In some implementations, at least some of the sets of SerDes interfaces can include a multiple respective SerDes interfaces. In the example shown in, the first set of SerDes interfaces includes eight SerDes interfaces, each configured to transmit data according to a throughput of 56 Gbit/s. Further, the second set of SerDes interfaces includes eight SerDes interfaces, each configured to transmit data according to a throughput of 56 Gbit/s. Further, the third set of SerDes interfaces includes sixteen SerDes interfaces, each configured to transmit data according to a throughput of 28 Gbit/s.

Although an example configuration of SerDes interfaces is described herein, this is merely an illustrative example. In practice, the first chip 200a and the second chip 200b can transmit and/or receive data according to any number of SerDes interfaces, each configured to transmit data according to any throughput.

As described above, the network switch 108 can establish one or more data streams for transmitting and/or receiving data. Further, the network switch 108 can allot particular amounts of network resources to each of the data streams. Further, each of the data streams can be associated with one or more respective optical subcarriers.

Figure 8:
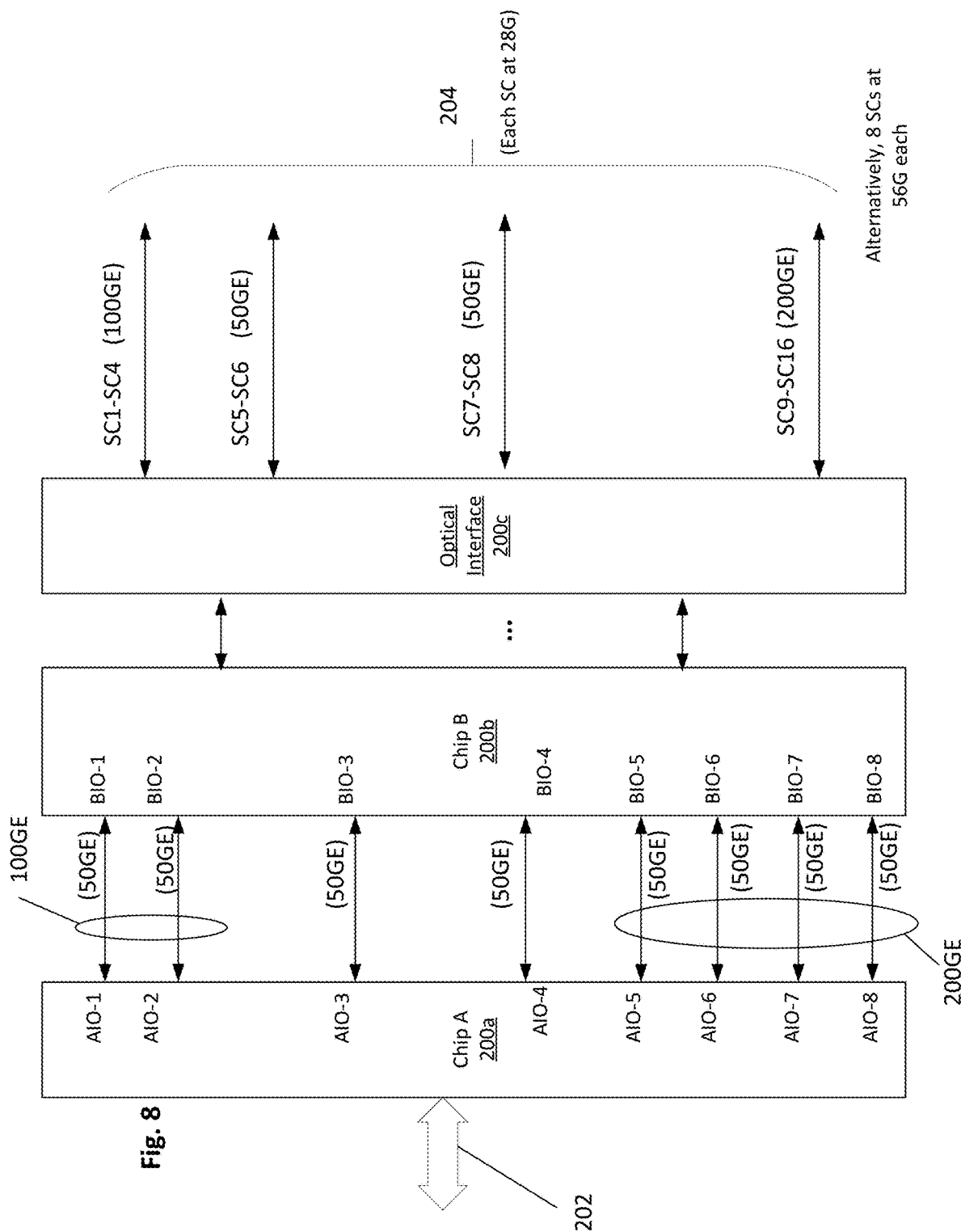
FIGS. 8-10 show examples of transmission and reception of data by the network switch shown in FIG. 2*a*.

To illustrate, FIG. 8 shows an example data routing operation of the network switch 108 shown in FIG. 1. Here, client data is provided to chip 200a. The client data in this example is supplied as a 100GE data flow, two 50GE data flows, and a 200GE data flow. Chip 200a inputs/outputs these flows as eight flows, each being a 50GE flow. That is, the 100GE flow corresponds to inputs/outputs AIO-1 and AIO-2 of switch chip 200a. Each of the two 50GE data flows corresponds to the inputs/outputs AIO-3 and AIO-4, and the 200GE flow corresponds to the 50GE inputs/outputs AIO-5 to AIO-8. Inputs/outputs AIO-1 to AIO-8 are coupled to a respective one of inputs/outputs of AIO-5 to AIO-8 of chip 200B. Circuitry in chip 200b noted above allocates these flows in a manner such that outputs from chip 200b are provied to optical interface 200c to output subcarriers SC1 to SC4 associated with the 100GE flow, subcarriers SC5 and SC6 are associated with the 50GE flow, optical subcarriers SC7 and SC8 are associated with the other 50GE flow, and optical subcarriers SC9-SC16 are associated with the 200GE flow. In this example, each optical subcarrier SC1 to SC16 carries data at a rate of 28G. Alternatively, eight subcarriers may be transmitted, each carrying 56G each. In that case two such subcarriers are associated with the 100GE flow, one subcarrier is associated with one 50GE flow and another is associated with the other 50GE flow, and four subcarriers are associated with the 200GE flow.

In this example, the first chip 200a receives four data streams 404a-404d using the first set of SerDes interfaces 402a (e.g., from one or more of the network nodes 102a-102n and 104-1-104-n), and routes the data therein to the second chip 200b as four data streams 406a-406d using the second set of SerDes interfaces 402b. The second chip 200b determines the intended destination or destinations for the received data, and transmits the data to its intended destination or destinations as four data streams 408a-408d using the third set of SerDes interfaces 402c. In some implementations, each of the data streams 408a-408d can correspond to a different respective destination (e.g., a particular one of the network nodes 102a-102n and 104-1-104-n).

Further, the network switch 108 can allot particular amounts of network resources to each of the data streams. For instance, in the example shown in FIG. 4B, the data stream 404a can be allotted network resources that enable data to be transmitted according to a throughput of 100 Gbit/s (e.g., allotted use of two SerDes interfaces of the first set of SerDes interfaces 402a), each of the data streams 404b and 404c can be allotted network resources that enable data to be transmitted according to a throughput of 50 Gbit/s (e.g., allotted use of one SerDes interface of the first set of SerDes interfaces 402a each), and the data stream 404d can be allotted network resources that enable data to be transmitted according to a throughput of 200 Gbit/s (e.g., allotted use of four SerDes interfaces of the first set of SerDes interfaces 402a).

As another example, the data stream 406a can be used to route data received from the data stream 404a, and can be allotted network resources that enable data to be transmitted according to a throughput of 100 Gbit/s (e.g., allotted use of two SerDes interfaces of the second set of SerDes interfaces 402b). Further, each of the data streams 406b and 406c can be used to route data received from the data streams 404b and 404c, respectively, and each can be allotted network resources that enable data to be transmitted according to a throughput of 50 Gbit/s (e.g., allotted use of one SerDes interface of the second set of SerDes interfaces 402b each). Further, the data stream 406d can be used to route data received from the data stream 404d, and can be allotted network resources that enable data to be transmitted according to a throughput of 200 Gbit/s (e.g., allotted use of four SerDes interfaces of the second set of SerDes interfaces 402b).

As another example, the data stream 408a can be used to route data received from the data stream 406a, and can be allotted network resources that enable data to be transmitted according to a throughput of 100 Gbit/s (e.g., allotted use of four SerDes interfaces of the third set of SerDes interfaces 402c). Further, each of the data streams 408b and 408c can be used to route data received from the data streams 406b and 406c, respectively, and each can be allotted network resources that enable data to be transmitted according to a throughput of 50 Gbit/s (e.g., allotted use of two SerDes interfaces of the third set of SerDes interfaces 402c each). Further, the data stream 408d can be used to route data received from the data stream 406d, and can be allotted network resources that enable data to be transmitted according to a throughput of 200 Gbit/s (e.g., allotted use of eight SerDes interfaces of the third set of SerDes interfaces 402c).

Further, as discussed above, each of the data streams transmitted by the second chip 200b can be associated with one or more respective optical subcarriers.

In some implementations, each of the data streams 408a-408d can be transmitted to multiple different network nodes (e.g., using an optical signal modulated according to multiple sets of optical subcarriers). Each of the network nodes can selectively recover the data stream that is intended for it (e.g., by demodulating the optical signal according to the set of optical subcarriers that is associated with the network node), while refraining from recovering the data streams that are intended for other network nodes.

For example, referring to FIG. 4B, the network switch 108 can generate an optical signal, and modulate the optical signal according to the optical subcarriers SC1-SC4 such that it carries data intended for a first network node as a data stream 408a. Further, the network switch 108 can modulate the optical signal according to the optical subcarriers SC5 and SC6 such that it carries data intended for a second network node as a data stream 408b. Further, the network switch 108 can modulate the optical signal according to the optical subcarriers SC7 and SC8 such that it carries data intended for a third network node as a data stream 408c. Further, the network switch 108 can modulate the optical signal according to the optical subcarriers SC9-SC16 such that it carries data intended for a fourth network node as a data stream 408d. The network switch 108 can transmit an instance of the modulated optical signal (e.g., a respective power-divided instance of the optical signal) to each of these network nodes.

Further, each of the network nodes can selectively demodulate the optical signal that it receives according to the set of optical subcarriers to which it is associated (e.g., to receive the data that is intended for it). For example, the first network node can demodulate the optical signal that it receives according to the optical subcarriers SC1-SC4 to recover the data that is intended for it (e.g., the data stream 408a). Further, the second network node can demodulate the optical signal that it receives according to the optical subcarriers SC5 and SC6 to recover the data that is intended for it (e.g., the data stream 408b). Further, the third network node can demodulate the optical signal that it receives according to the optical subcarriers SC7 and SC8 to recover the data that is intended for it (e.g., the data stream 408c). Further, the fourth network node can demodulate the optical signal that it receives according to the optical subcarriers SC9-SC16 to recover the data that is intended for it (e.g., the data stream 408d). Further, each of the intended destination can selectively ignore, block, or otherwise not demodulate the optical signal according to the sets of optical subcarriers to which it is not associated (e.g., such that it refrains from recovering the data that is not intended for it).

In the example shown in FIG. 8, the first chip 200a and the second chip 200b exchange data using a set of SerDes interfaces. However, this need not always be the case. For example, in some implementations, the first chip 200a and the second chip 200b exchange data according to an interface implemented according to the Flexible Ethernet (FlexE) communications protocol (e.g., specified by the Optical Internetworking Forum, OIF) or other appropriate protocol.

Figure 9:
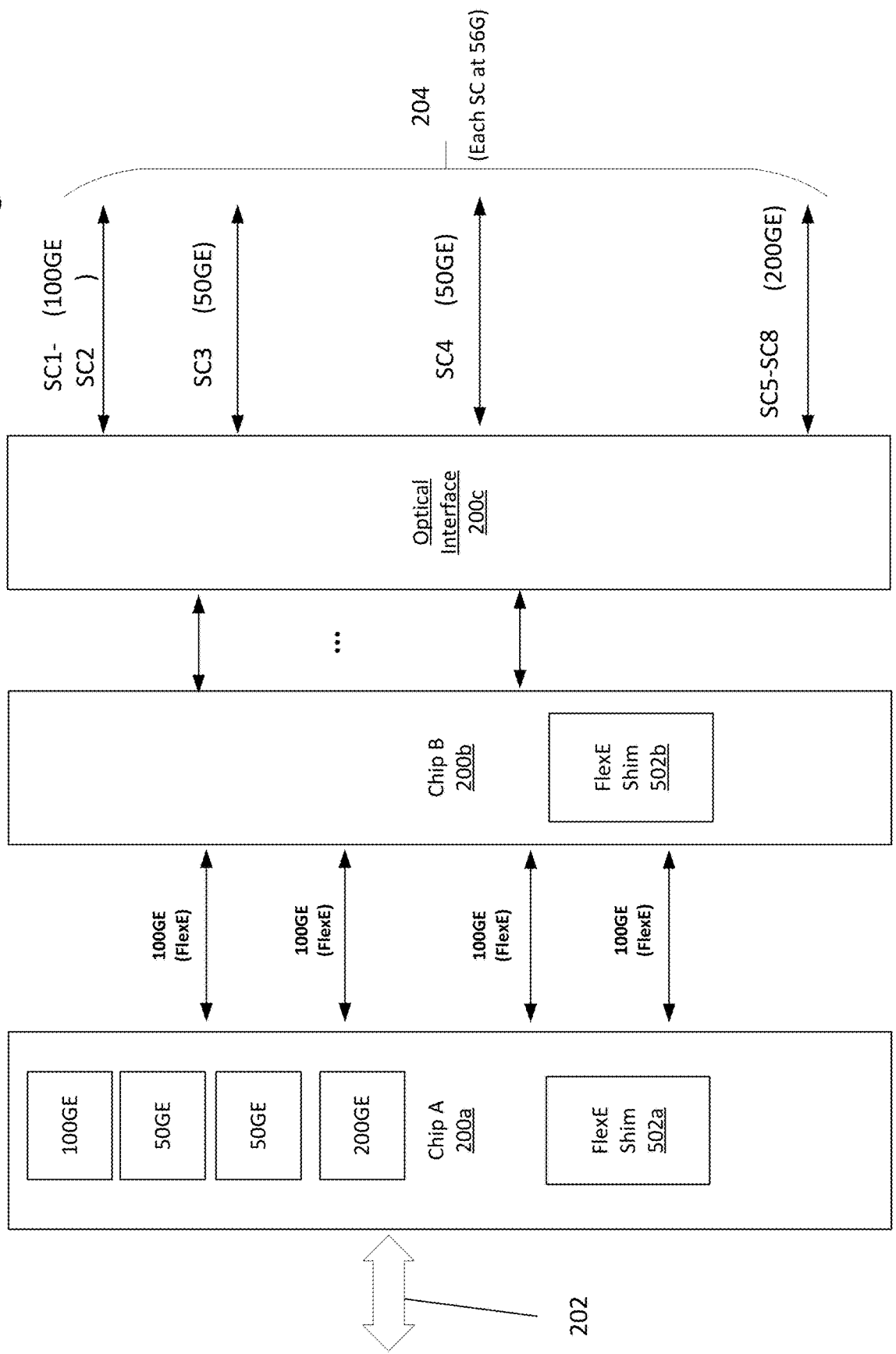

As an example, FIG. 9 shows a network switch 108 having a first chip 200a and a second chip 200b. In general, the first chip 200a and the second chip 200b can be similar to those described above. Further, the first chip 200a can receive data and the second chip 200b can transmit data in a similar manner as described above. For example, the network switch 108 can include a set of SerDes interfaces that enable the first chip 200a to receive data (e.g., from one or more network nodes), and another set of SerDes interfaces that enable the second chip 200b to transmit data (e.g., to one or more network nodes).

However, this in example, instead of having a set of SerDes interfaces to exchange data between the first chip 200a and the second chip 200b, the network switch 108 includes components that enable the first chip 200a and the second chip 200b to exchange data according to the FlexE communications protocol. For instance, the first chip 200a can include a first FlexE shim 502a, and the second chip 200b can include a second FlexE shim 502b. Further, the first FlexE shim 502a and the second FlexE shim 502b are communicatively coupled to one another by a set of FlexE interfaces (e.g., Ethernet links) extending between them. For instance, in this example, the first FlexE shim 502a and the second FlexE shim 502b are interconnected by a set of four FlexE interfaces, each configured to transmit data according to a throughput of 100 Gbit/s.

During operation for the network switch 108, the first FlexE shim 502a and the second FlexE shim 502b can exchange data streams by transmitting each data stream using a single FlexE interface or using multiple FlexE interfaces.

To illustrate, FIG. 9 shows an example of a data routing operation of the network switch 108. In this example, the FlexE shim 502a of the first chip 200a receives four data streams 100GE, 50GE, 50GE, and 200GE using the first set of SerDes interfaces (e.g., from one or more of the network nodes 102a-102n and 104-1-104-n), and routes the data therein to the FlexE shim 502b of the second chip 200b as four data streams each at 100GE using the set of FlexE interfaces 504. The FlexE shim 502a can transmit the data received from each of these 100GE data streams using one of the FlexE interfaces 504 (or a portion thereof), or using multiple FlexE interfaces 504. Allocating the data flows into lower rate flows and granular flow and mapping such flows to m output to the optical interface for further output on assigned optical subcarriers is similar to that described above.

Further, in another example, the second chip 200b determines the intended destination or destinations for the received data, and transmits the data to its intended destination or destinations as four data streams using the set of SerDes interfaces. In some implementations, each of the data streams 510a-510d can correspond to a different respective destination (e.g., a particular one of the network nodes 104-1-104-n).

Further, as discussed above, each of the data streams transmitted by the second chip 200b can be associated with one or more respective optical subcarriers. For instance, in the example shown in FIG. 9, the data stream 510a can be used to transmit data to a first network node. Here, as in the example noted above, optical subcarriers SC1 and SC2 are associated with the 100GE flow, subcarriers SC3 and SC4 are each associated with respective 50GE flows, and optical subcarriers SC5-SC8 are associated with the 200GE flow. Also, as in one of the above examples, each subcarrier carries data at a rate of 56 Gbit/s.

Figure 10:
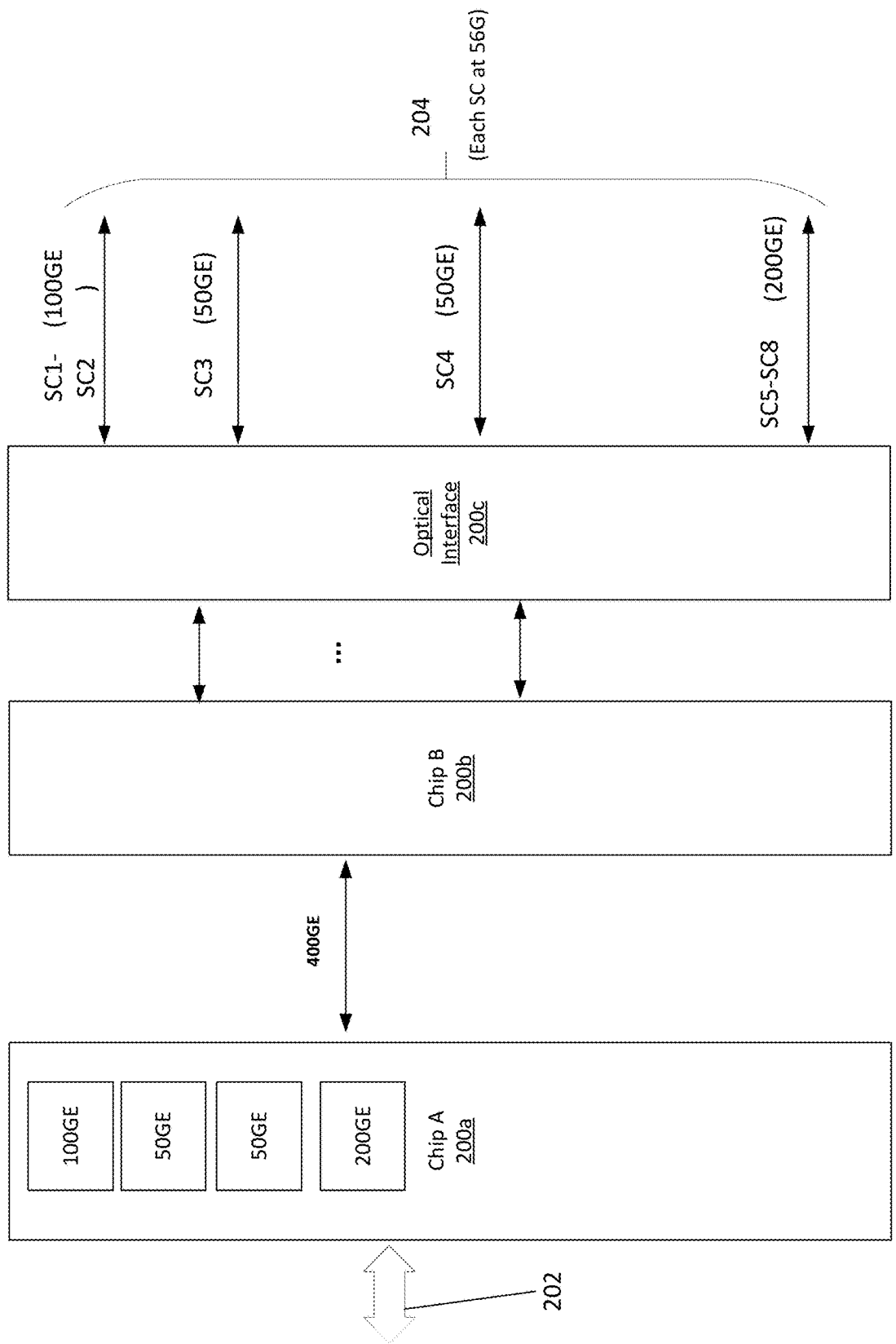

The example shown in FIG. 10 is similar to the examples discussed above and carries out a similar optical subcarrier data allocation as that described above. In FIG. 10, however, rather than multiple flows being transmitted between chips 200a and 200b, one flow at a relatively high data rate is transmitted between these two chips. Chip 200b, in this example, performs inverse muxing in a manner similar to that described above to map the outputs of chip 200b to m outputs and thus associate or assigned data flows to corresponding optical subcarriers.

As described above, in some implementations, a network switch 108 can dynamically adjust each of the data streams during operation. This can be useful, for example, as it enables network sources to be used more efficiently on the optical communications network.

For example, if additional network nodes are coupled to the optical communications network, the network switch can establish additional data streams to transmit data to and/or receive data from those network nodes, associate respective sets of optical subcarriers with each of the additional data streams, and allot respective sets of network resources to each of the additional data streams. As another example, if network nodes are removed from the optical communications network, the network switch can remove the data streams associated with those network nodes, and reallot the optical subcarriers and/or network resources for the removed data streams to other data streams.

As another example, the network switch can dynamically increase the number of optical subcarriers and/or the amount network resources that are allotted to certain data streams (e.g., to accommodate the transfer of a greater volume of data and/or the transfer of data according to a higher throughput to the corresponding network node). As another example, the network switch can dynamically reduce the number of optical subcarriers and/or the amount network resources that are allotted to certain data streams (e.g., if the volume of data transmitted to the corresponding network node is sufficiently low and/or if the data can be transmitted according to a lower throughput, such that the optical subcarriers and/or network resources are better utilized elsewhere).

Figure 11:
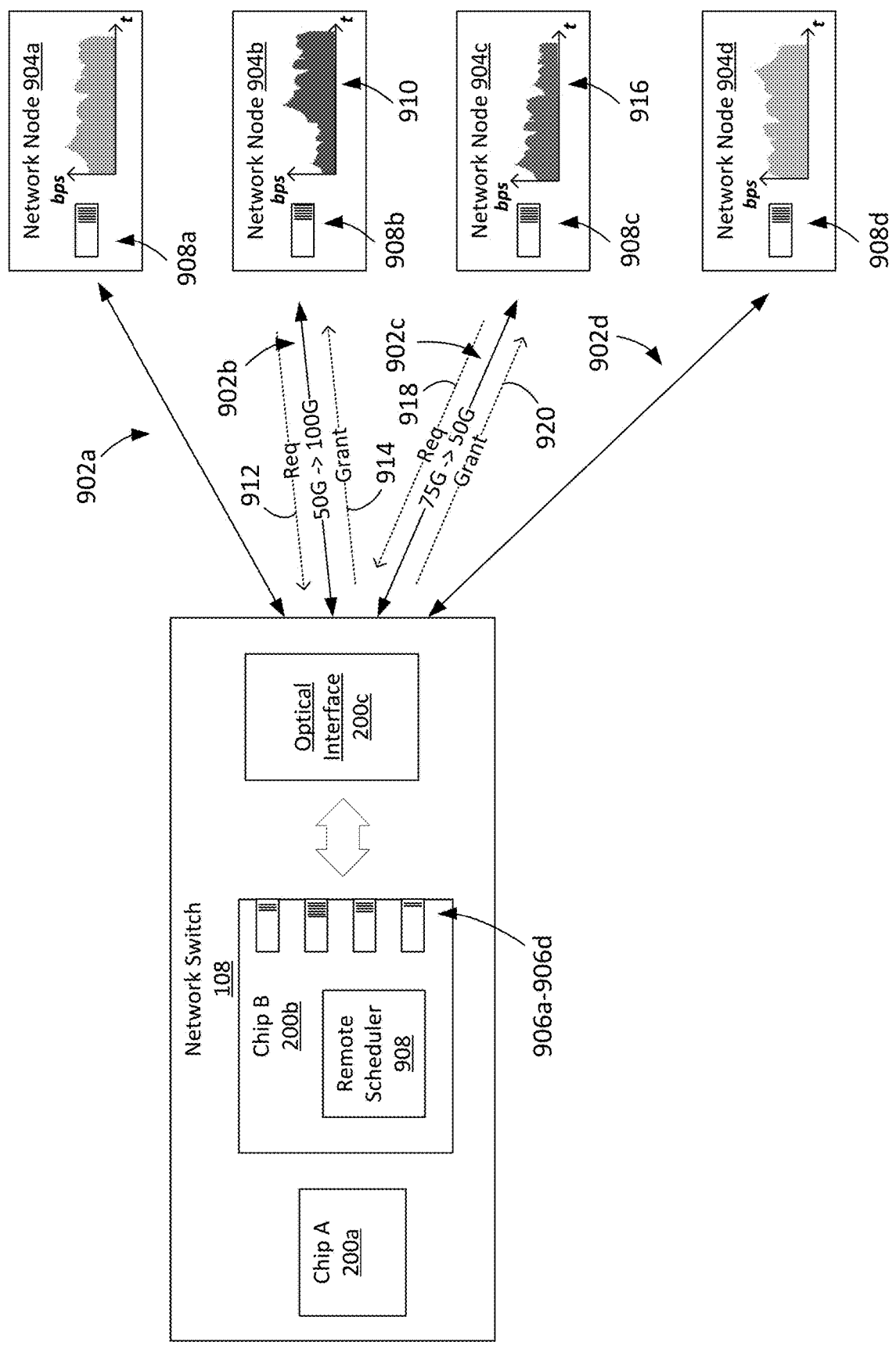
FIG. 11 shows an example of transmission and reception of variable data rates between a network switch and network nodes consistent with an additional aspect of the present disclosure.

To illustrate, FIG. 11 shows an example adjustment operation of the network switch 108. In some implementations, the operation shown in FIG. 11 can be performed using one or more of the systems described herein.

In the example shown in FIG. 11, the second chip 200b of the network switch 108 is configured to transmit data streams 902a-902d to network nodes 904a-904d, respectively. The network nodes 908a-908d can be similar to the network nodes 104-1-104-n as described above.

Further, the second chip 200b can queue data to be transmitted to each of the network nodes 904a-904d in respective data buffers, prior to the transmission of the data. For example, the second chip 200b can include data buffers 906a-906d, each configured to store data intended for a different one of the network nodes 904a-904d, respectively. The data buffers 906a-906d can queue data for transmission according to various scheduling policies, such as first-in-first-out (FIFO), last in first out (LIFO), shortest job next (SJN), quality of service (QoS) prioritization, and/or any other scheduling policy. In some implementations, the queueing of data into the data buffers 906a-906d can be controlled, at least in part, by a remote schedule module 908 (e.g., implemented as a part of the circuitry of the second chip 200b).

In some implementations, data can be transmitted from the data buffers 906a-906d periodically. For example, the second chip 200b can generate a clock signal to synchronize the transmission of data from the data buffers 906a-906d. During particular times in the clock signal (e.g., when the clock signal shifts from a low or high value, or vice versa), each of the data buffers 906a-908d can transmit a portion of data (e.g., a data packet) to a respective one of the network nodes 904a-904d.

In some implementations, each of the network nodes 904a-904d can include a respective data buffer 908a-908d for receiving data. For example, when data that is received from the data streams 902a-902d can initially be queued in data buffers 908a-908d, respectively. The network node 904a-904d can subsequently retrieve data from the data buffers 908a-908d for further processing.

Further, the network switch 108 can dynamically adjust each of the data streams 902a-902d during operation. For example, if additional network nodes are coupled to the network switch 108, the network switch 108 can establish additional data streams (e.g., 902e, 902f, . . . , 902n) to transmit data to and/or receive data from those network nodes, associate respective sets of optical subcarriers with each of the additional data streams, and allot respective sets of network resources to each of the additional data streams. As another example, if network nodes are uncoupled from the network switch 108, the network switch can remove the data streams associated with those network nodes, and reallot the optical subcarriers and/or network resources for the removed data streams to other data streams.

As another example, the network switch 108 can dynamically increase the number of optical subcarriers and/or the amount network resources that are allotted to certain data streams (e.g., to accommodate the transfer of a greater volume of data and/or the transfer of data according to a higher throughput to the corresponding network node). For instance, in the example shown in FIG. 9, the network node 904b experiences an increase in the amount of data that is received over time (e.g., as shown in the plot 910). If this increase is sufficiently large (e.g., the rate at which data is received exceeds a threshold value), the network node 904b can transmit a request message 912 to the network switch 108 (e.g., the second chip 200b) to increase the number of optical subcarriers and/or the amount network resources that are allotted to data transmission to the network node 904b. In response, the chip 200b determines whether any optical subcarriers and/or network resources are available for reallocation. If so, transmits a grant message 914 confirming that the request is granted, and reallocates the optical subcarriers and/or network resources. For instance, in the example shown in FIG. 9, the chip 200b increases the bandwidth allotted to transmitting data to the network node 904b (e.g., such that data throughput is increased from 50 Gbit/s to 100 Gbit/s). Further, the chip 200b can increase the number of optical subcarriers that are assigned for transmitting data to the network node 904b. In some implementations, at least some of these operations can be performed by the remote scheduler module 908.

As another example, the network switch can dynamically reduce the number of optical subcarriers and/or the amount network resources that are allotted to certain data streams (e.g., if the volume of data transmitted to the corresponding network node is sufficiently low and/or if the data can be transmitted according to a lower throughput, such that the optical subcarriers and/or network resources are better utilized elsewhere). For instance, in the example shown in FIG. 9, the network node 904c experiences a decrease in the amount of data that is received over time (e.g., as shown in the plot 916). If this decrease is sufficiently large (e.g., the rate at which data is received decreased below a threshold value), the network node 904c can transmit a request message 918 to the network switch 108 (e.g., the second chip 200b) to decrease the number of optical subcarriers and/or the amount network resources that are allotted to data transmission to the network node 904c. In response, the chip 200b transmits a grant message 920 confirming that the request is granted, and reallocates the optical subcarriers and/or network resources. For instance, in the example shown in FIG. 9, the chip 200b decreases the bandwidth allotted to transmitting data to the network node 904c (e.g., such that data throughput is decreased from 75 Gbit/s to 50 Gbit/s). Further, the chip 200b can decrease the number of optical subcarriers that are assigned for transmitting data to the network node 904c. In some implementations, at least some of these operations can be performed by the remote scheduler module 908.

In some implementations, the network switch 108 can dynamically adjust each of the data streams based on a priority associated with each of the data streams. For example, data streams that are associated with a higher priority can be allotted a greater number of optical subcarriers and/or amount network resources, whereas data streams that are associated with a lower priority can be allotted a lesser number of optical subcarriers and/or amount network resources. In some implementations, the priority associated with each of the data streams can be dynamically modified over time, and the network switch 108 can dynamically adjust each of the data streams based on the modifications (e.g., using the remote scheduler module 908).

In some implementations, the network switch 108 can dynamically adjust each of the data streams based on a relatively utilization rate of each of the data streams. For example, data streams that are used to transmit a greater volume of data over time can be allotted a greater number of optical subcarriers and/or amount network resources, whereas data streams that are used to transmit a smaller volume of data over time can be allotted a lesser number of optical subcarriers and/or amount network resources. In some implementations, the utilization of each of the data streams can be monitored over time, and the network switch 108 can dynamically adjust each of the data streams based on the modifications (e.g., by the remote scheduler module 908).

Figure 12:
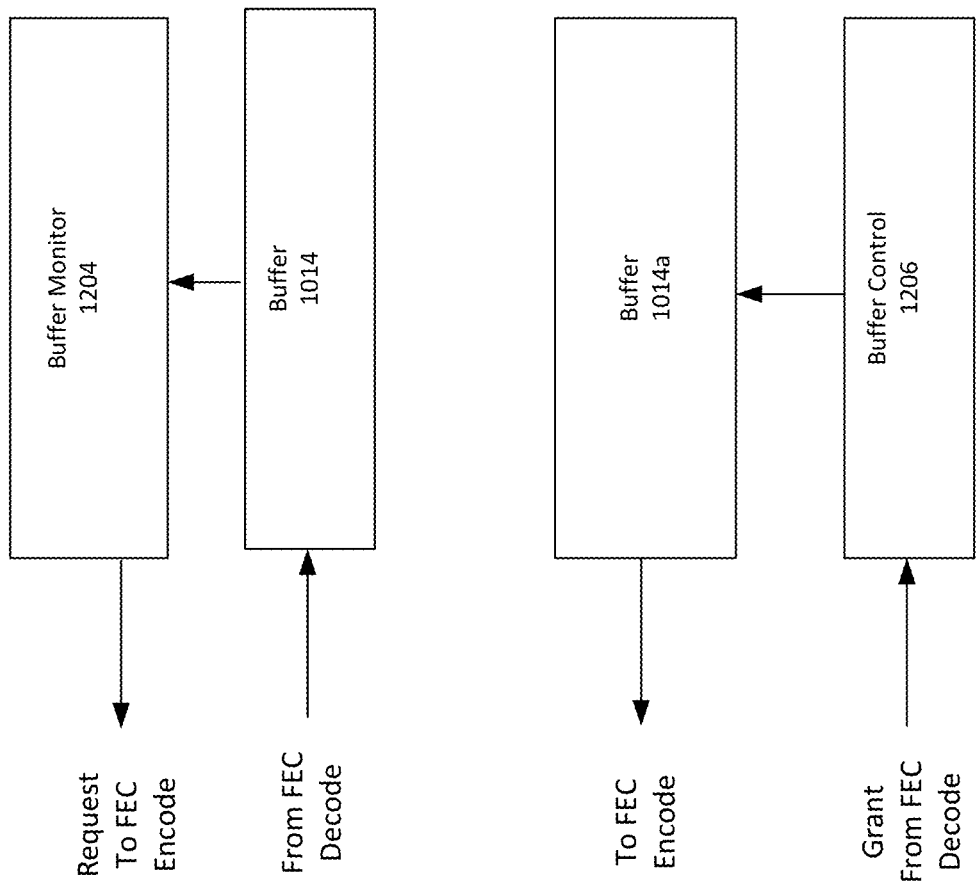
FIG. 12 shows an example of circuitry included in a network node shown in FIG. 11.

FIG. 12 illustrates examples of circuitry for generating a request for more or less capacity or bandwidth at a leaf or network node 104 and circuitry for receiving a grant for more or less transmission capacity. Here, a buffer monitor circuit 1204 monitors the amount of data in one or more of buffers 1014. It the amount of data received from the hub node exceeds a threshold, buffer monitor circuit generates information or data indicative of a request for the hub to receive a comparable amount of data or information from the leaf node. Such information or data is input to FEC encoder similar to encoder 1018, in one example, for transmission on one or more optical subcarriers output from the leaf node 104 to hub or network switch 108 in a manner similar to that described above. The hub 108 may processes such optical subcarrier(s) in a manner similar to that described above, to obtain the bandwidth request. In response to such request, hub 108, in turn, outputs information or data indicative of a grant, which is transmitted on one or more downstream optical subcarriers to the leaf node 104 that originated the bandwidth request. Such optical subcarrier is processed, as noted above, and the grant information is output from an FEC decoder in the leaf node. The grant request may then be provided to buffer control circuit 1206 for regulating the amount of data output from one or more buffers in the leaf node, which are similar to buffer 1014a. As a result, the amount of data or information output from the leaf node is correspondingly regulalted to either increase or decrease based on the grant information. which, in turn outputs transmit a corresponding amount of data to the network switch or hub 108 so that the amount of data received by the leaf node 104 is the same as or approximates the amount of data transmitted by the leaf or network node 104 so that data traffic can be efficiently managed, for example.

It is noted that each of network nodes 104 may have chips similar to chips 200a and 200b described above, as well as Rx and Tx optical line interfaces as further described above. Such circuitry in network nodes 104 operate in a similar manner to allocate or associate data for transmission on optical subcarriers to hub 108 and receipt and processing of subcarriers from hub 108.

Figure 13:
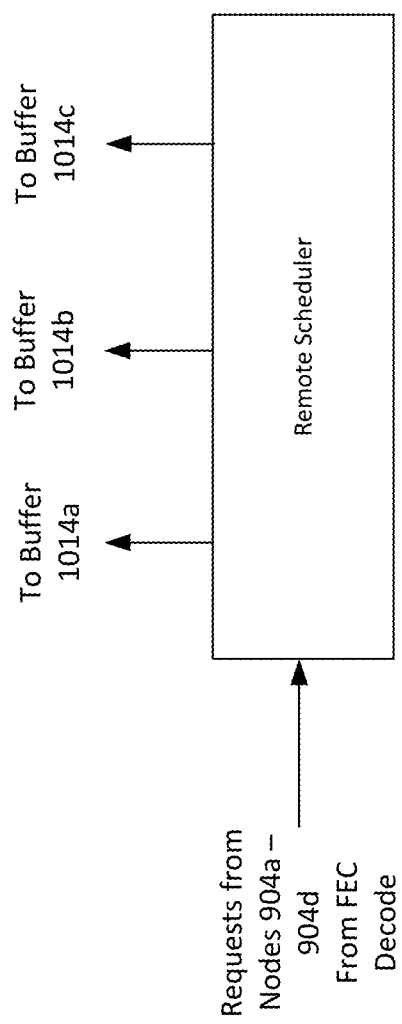
FIG. 13 shows an example of circuitry included in the network switch shown in FIG. 11.

FIG. 13 shows an example of a remote scheduler in hub 108 that receives requests from leaf nodes 904a to 904d following processing of optical subcarriers output from such nodes in the hub including FEC decoding. The requests may then be used by the remote scheduler to generates grant information that is supplied to buffers, such as buffers 1014a to 1014c, which in turn, outputs such grant information for output to the leaf nodes 104.

Some implementations described in this specification can be implemented as one or more groups or modules of digital electronic circuitry, computer software, firmware, or hardware, or in combinations of one or more of them. Although different modules can be used, each module need not be distinct, and multiple modules can be implemented on the same digital electronic circuitry, computer software, firmware, or hardware, or combination thereof.

Some implementations described in this specification can be implemented as one or more computer programs, i.e., one or more modules of computer program instructions, encoded on computer storage medium for execution by, or to control the operation of, data processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium also can be, or can be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus also can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows also can be performed by, and apparatus also can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read only memory or a random access memory or both. A computer includes a processor for performing actions in accordance with instructions and one or more memory devices for storing instructions and data. A computer may also include, or be operatively coupled to receive data from or transfer data to, or both, one or more mass storage devices for storing data, e.g., magnetic, magneto optical disks, or optical disks. However, a computer need not have such devices. Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD-ROM and DVD-ROM disks. The processor and the memory can be supplemented by, or incorporated in, special purpose logic circuitry.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

While this specification contains many details, these should not be construed as limitations on the scope of what may be claimed, but rather as descriptions of features specific to particular examples. Certain features that are described in this specification in the context of separate implementations also can be combined in the same implementation. Conversely, various features that are described in the context of a single implementation also can be implemented in multiple embodiments separately or in any suitable sub-combination.

A number of implementations have been described. Nevertheless, it will be understood that various modifications may be made without departing from the spirit and scope of the invention. Accordingly, other implementations are within the scope of the claims.

What is claimed is:

1. A method comprising:
    receiving, by a first network device from a plurality of second network devices, a plurality of data streams to be output from a plurality of third network devices in an optical communications network;
    demultiplexing the plurality of data streams;
    supplying the demultiplexed data streams to a plurality of buffers;
    outputting the demultiplexed data streams from the plurality of buffers to a multiplexer,
    asynchronously mapping, with the multiplexer, the plurality of data streams into a plurality of time slots;
    identifying, by the first network device, for each one of the data streams, a different respective subset of optical subcarriers for transmitting that data stream;
    generating, by the first network device, an optical signal, wherein the optical signal includes each of the subsets of optical subcarriers, and wherein said each of the subsets of optical subcarriers carries information indicative of a respective one of the plurality of data streams;
    scheduling, based on an output of a forward error correction decoder, transmission of said each of the subsets of optical subcarriers;
    transmitting, by the first network device, the subsets of optical subcarriers to each of the third network devices over the optical communications network based on said scheduling.

2. The method of claim 1, wherein each of the subsets of optical subcarriers is selected from a plurality of optical subcarriers allotted to the first network device.

3. The method of claim 2, wherein at least some of the plurality of optical subcarriers are contiguous with one another in a frequency domain.

4. The method of claim 1, wherein the first network device comprises:
    a first chip comprising first circuitry, and
    a second chip comprising second circuitry,
    wherein the plurality of data streams are received from the plurality of second network devices using the first chip via one or more first communications links,
    wherein the plurality of subsets of optical subcarriers is transmitted to the plurality of third network devices via one or more second communications links, and
    wherein the method further comprises transmitting the information associated with the plurality of data streams from the first chip to the second chip using one or more third communications links.

5. The method of claim 4, wherein the one or more first communications links are established by one or more serializer/deserializer (SerDes) modules.

6. The method of claim 4, wherein the one or more third communications links are established by one or more serializer/deserializer (SerDes) modules.

7. The method claim 4, wherein the one or more second communications links comprise:
    one or more communications links, each having a fixed bandwidth.

8. The method claim 4, wherein the one or more second communications links comprise:
    one or more communications links, each having a variable bandwidth.

9. The method of claim 4, wherein the one or more first communications links and the one or more second communications links are equal in number.

10. The method of claim 4, wherein a bandwidth of each one of the one or more first communications links is equal to a bandwidth of a respective one of the one or more second communications links.

11. The method of claim 4, wherein the one or more first communications links and the one or more third communications links differ in number.

12. The method of claim 11, a number of the one or more first communications links is less than a number of the one or more third communications links.

13. The method of claim 12, wherein at least one of the plurality of data streams complies with a Flexible Ethernet protocol.

14. The method of claim 11, wherein a number of the one or more first communications links is greater than a number of the one or more third communications links.

15. The method of claim 14, wherein the number of the one or more third communications links is one.

16. The method of claim 14, wherein each of the one or more third communications links comprises a respective logical group of physical links communicatively coupling the second chip to a respective one of the third network devices.

17. The method of claim 4, wherein the second chip includes:

a respective transmission buffer for each one of the third network devices, the method further includes:
receiving, by the second chip, the plurality of data streams;
queueing, by the second chip, network packets associated with the plurality of data streams into a respective one of the transmission buffers; and
transmitting, by the second chip, the network packets from each of the transmission buffers to a respective one of the third network devices over the optical communications network.

18. The method of claim 17, wherein the network packets are transmitted from each one of the transmission buffers according to a fixed clock frequency.

19. The method of claim 17, further comprising:
receiving, by the second chip from one of the third network devices, a request to modify a bandwidth associated with the respective one of the third network devices;
responsive to receiving the request, transmitting, by the second chip to the respective one of the third network devices, a confirmation of the request; and
transmitting, by the second chip to the respective one of the third network devices, the network packets from a corresponding one of the transmission buffers according to a modified bandwidth.

20. The method of claim 19, further includes:
increasing the bandwidth associated with one of the third network devices according to which selected ones of the data packets are transmitted to said one of the third network devices.

21. The method of claim 19, further includes:
decreasing the bandwidth associated with one of the third network devices according to which selected ones of the data packets are transmitted to said one of the third network devices.

22. The method of claim 1, wherein the plurality of second network devices comprises one or more hub network devices, and wherein the plurality of third network devices comprises one or more leaf network devices.

23. An apparatus comprising:
first circuitry, which is configured to be communicatively coupled to a first network device, and wherein the first circuitry is configured to:
receive, from a plurality of second network devices via the first network device, a plurality of data streams to be output from a plurality of third network devices;
identify, for each one of the data streams, a different respective subset of optical subcarriers for transmitting information associated with that data stream;
schedule, based on an output of a forward error correction decoder, transmission of the subsets of optical subcarriers;
transmit each of the subsets of the optical subcarriers to the third network devices over an optical communications network, wherein each of the data streams is associated with a different respective one of the subsets of the optical subcarriers;
a demultiplexer operable to demultiplex the plurality of data streams;
a plurality of buffers operable to receive the demultiplexed data streams; and
a multiplexer operable to receive the demultiplexed data streams from the plurality of buffers, wherein the multiplexer asynchronously maps the plurality of data streams into a plurality of time slots.

24. The apparatus of claim 23, wherein each of the subsets of optical subcarriers is selected from a plurality of optical subcarriers allotted to the first network device.

25. The apparatus of claim 24, wherein at least some of the plurality of optical subcarriers are contiguous with one another in a frequency domain.

26. The apparatus of claim 23,
wherein the first network device comprises second circuitry, wherein the second circuitry is configured to receive the plurality of data streams from the plurality of second network devices via one or more first communications links,
wherein the first circuitry is communicatively coupled to the second circuitry, and wherein the first circuitry is configured to:
transmit the information associated with the plurality of data streams to the plurality of third network devices via one or more second communications links, and
receive the information associated with the plurality of data streams from the second circuitry using one or more third communications links.

27. The method of claim 26, wherein the one or more third communications links are established by one or more serializer/deserializer (SerDes) modules.

28. The apparatus claim 26, wherein the one or more second communications links comprise:
one or more communications links, each having a fixed bandwidth.

29. The apparatus claim 26, wherein the one or more second communications links comprise:
one or more communications links, each having a variable bandwidth.

30. The apparatus of claim 26, wherein the one or more first communications links and the one or more second communications links are equal in number.

31. The apparatus of claim 26, wherein a bandwidth of each one of the one or more first communications links is equal to a bandwidth of a respective one of the one or more second communications links.

32. The apparatus of claim 26, wherein the one or more first communications links and the one or more third communications links differ in number.

33. The apparatus of claim 32, a number of the one or more first communications links is less than a number of the one or more third communications links.

34. The apparatus of claim 33, wherein at least one of the plurality of data streams complies using a Flexible Ethernet protocol.

35. The apparatus of claim 32, wherein a number of the one or more first communications links is greater than a number of the one or more third communications links.

36. The apparatus of claim 35, wherein the number of the one or more third communications links is one.

37. The apparatus of claim 35, wherein each of the one or more third communications links comprises a respective logical group of physical links communicatively coupling the second chip to a respective one of the third network devices.

38. The apparatus of claim 26, wherein the first circuitry includes:
a respective transmission buffer for each one of the third network devices, wherein the first circuitry is operable to: receive the plurality of data streams;
queue network packets associated with the plurality of data streams into a respective one of the transmission buffers; and transmit the network packets from each one of the transmission buffers to a respective one of the third network devices over the optical communications network.

39. The apparatus of claim 38, wherein the first chip is configured to transmit the network packets from each one of the transmission buffers according to a fixed clock frequency.

40. The apparatus of claim 39, wherein the first circuitry is configured to:
receive, from one of the third network devices, a request to modify a bandwidth associated with the respective one of the third network device;
responsive to receiving the request, transmit, to the respective one of the third network devices, a confirmation of the request; and
transmit, to the respective one of the third network devices, the network packets from a corresponding one of the transmission buffers according to a modified bandwidth.

41. The apparatus of claim 39, wherein the first circuitry is configured to increase the bandwidth associated with one of the third network devices according to which selected ones of the data packets are transmitted said one of the third network devices.

42. The apparatus of claim 39, wherein the first circuitry is configured to decrease the bandwidth associated with one of the third network devices according to which selected ones of the data packets are transmitted to said one of the third network devices.

43. The apparatus of claim 23, wherein the plurality of second network devices comprises one or more hub network devices, and wherein the plurality of third network devices comprises one or more leaf network devices.

44. A system comprising:
a first network device comprising:
first circuitry, and
second circuitry,
wherein the first circuitry and the second circuitry are configured to:
receive, from a plurality of second network devices, a plurality of data streams to be output from a plurality of third network devices;
identify, for each one of the data streams, a different respective subset of optical subcarriers for transmitting information associated with that data stream;
schedule, based on an output of a forward error correction decoder, transmission of the subsets of optical subcarriers; and
transmit each of the subsets of the optical subcarriers to the third network devices over an optical communications network, wherein each of the data streams is associated with a different respective one of the subsets of the optical subcarriers;
a demultiplexer operable to demultiplex the plurality of data streams;
a plurality of buffers operable to receive the demultiplexed data streams; and
a multiplexer operable to receive the demultiplexed data streams from the plurality of buffers, wherein the multiplexer asynchronously maps the plurality of data streams into a plurality of time slots.

45. The system of claim 44, wherein each of the subsets of optical subcarriers is selected from a plurality of optical subcarriers allotted to the first network device.

46. The system of claim 45, wherein at least some of the plurality of optical subcarriers are contiguous with one another in a frequency domain.

47. The system of claim 45,
wherein the first circuitry is configured to:
receive the information associated with the plurality of data streams from the plurality of second network devices via one or more first communications links, and
transmit the information associated with the plurality to data streams to the second chip using one or more third communications links, and
wherein the first circuitry is configured to transmit the plurality of data streams to the plurality of third network devices using the second circuitry via one or more second communications links.

48. The system of claim 47, wherein the one or more first communications links are established by one or more serializer/deserializer (SerDes) modules.

49. The system of claim 48, wherein the one or more third communications links are established by one or more serializer/deserializer (SerDes) modules.

50. The system claim 47, wherein the one or more second communications links comprise:
one or more communications links, each having a fixed bandwidth.

51. The system claim 47, wherein the one or more second communications links comprise:
one or more communications links, each having a variable bandwidth.

52. The system of claim 47, wherein the one or more first communications links and the one or more second communications links are equal in number.

53. The system of claim 47, wherein a bandwidth of each one of the one or more first communications links is equal to a bandwidth of a respective one of the one or more second communications links.

54. The system of claim 47, wherein the one or more first communications links and the one or more third communications links differ in number.

55. The system of claim 44, a number of the one or more first communications links is less than a number of the one or more third communications links.

56. The system of claim 55, wherein at least one of the plurality of data streams complies with a Flexible Ethernet protocol.

57. The system of claim 54, wherein a number of the one or more first communications links is greater than a number of the one or more third communications links.

58. The system of claim 57, wherein the number of the one or more third communications links is one.

59. The system of claim 57, wherein each of the one or more third communications links comprises a respective logical group of physical links communicatively coupling the second chip to a respective one of the third network devices.

60. The system of claim 47, wherein the second circuitry includes a respective transmission buffer for each one of the third network devices, the second circuitry is configured to transmit each one of the data streams to the plurality of third network devices by:
receiving the plurality of data streams;
queueing network packets of each of the plurality of data streams into a respective one of the transmission buffers; and
transmitting the network packets from each one of the transmission buffers to a respective one of the third network devices over the optical communications network.

61. The system of claim 60, wherein the network packets are transmitted from each one of the transmission buffers according to a fixed clock frequency.

62. The system of claim 60, wherein the second circuitry is configured to:
receive, from one of the third network devices, a request to modify a bandwidth associated with the respective one of the third network devices;
responsive to receiving the request, transmit, to the respective one of the third network devices, a confirmation of the request; and
transmit, to the respective one of the third network devices, the network packets from a corresponding one of the transmission buffers according to a modified bandwidth.

63. The system of claim 62, wherein the second circuitry is configured to increase the bandwidth associated with one of the third network devices according to which selected ones of the data packets are transmitted to said one of the third network devices.

64. The system of claim 62, wherein the second circuitry is configured to decrease the bandwidth associated with one of the third network devices according to which selected ones of the data packets are transmitted to said one of the third network devices.

65. The system of claim 44, wherein the plurality of second network devices comprises one or more hub network devices, and wherein the plurality of third network devices comprises one or more leaf network devices.

\* \* \* \* \*